(12) United States Patent
Kawahata

(10) Patent No.: US 7,343,094 B2
(45) Date of Patent: Mar. 11, 2008

(54) TRANSMISSION CHARACTERISTICS EVALUATION SYSTEM AND PSEUDO TRANSMISSION PATH APPARATUS THEREOF

(75) Inventor: Yuichi Kawahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 11/100,599

(22) Filed: Apr. 7, 2005

(65) Prior Publication Data

US 2005/0180748 A1 Aug. 18, 2005

Related U.S. Application Data

(63) Continuation-in-part of application No. PCT/JP03/003244, filed on Mar. 18, 2003.

(30) Foreign Application Priority Data

Sep. 17, 2004 (JP) .............................. 2004-271264

(51) Int. Cl.
*H04B 10/08* (2006.01)
*H04B 10/12* (2006.01)
*H04B 10/00* (2006.01)
*H04J 14/02* (2006.01)

(52) U.S. Cl. ........................... 398/16; 398/33; 398/88; 398/93; 398/147; 398/158

(58) Field of Classification Search .................. 398/16, 398/28, 29, 33, 38, 81, 82, 86–88, 93, 94, 398/96, 147, 158, 159
See application file for complete search history.

(56) References Cited

U.S. PATENT DOCUMENTS

| | | | | |
|---|---|---|---|---|
| 5,838,849 A | 11/1998 | Shirasaki | ..................... | 385/31 |
| 5,894,362 A * | 4/1999 | Onaka et al. | ................. | 398/95 |
| 5,930,045 A | 7/1999 | Shirasaki | ..................... | 359/577 |
| 5,969,865 A | 10/1999 | Shirasaki | ..................... | 359/577 |
| 5,969,866 A | 10/1999 | Shirasaki | ..................... | 359/577 |

(Continued)

FOREIGN PATENT DOCUMENTS

JP 1-160237 6/1989

(Continued)

OTHER PUBLICATIONS

Japanese Patent Office Notification of Reasons for Rejection mailed Jul. 4, 2006 for corresponding Japanese Patent Application No. 2004-569561.

*Primary Examiner*—Dalzid Singh
(74) *Attorney, Agent, or Firm*—Stass & Halsey LLP

(57) ABSTRACT

A transmission characteristics evaluation system can measure the dispersion tolerance and the insertion loss gradient tolerance at a high precision with reduced number of working steps for the measurement in evaluating the transmission characteristics of an optical module.

The transmission characteristics evaluation system comprises an optical transmitting apparatus, an optical receiving apparatus for, and a pseudo transmission path apparatus interposed between the optical transmitting apparatus and the optical receiving apparatus. The pseudo transmission path apparatus has, in a pseudo manner, transmission characteristics of a transmission path to which the optical transmitting apparatus and the optical receiving apparatus are to be connected. The pseudo transmission path apparatus comprises a transmission characteristics setting section for setting transmission characteristics equivalent to the transmission characteristics that the transmission path can have, by controlling a mirror or an optical element.

20 Claims, 13 Drawing Sheets

U.S. PATENT DOCUMENTS

| | | | |
|---|---|---|---|
| 5,973,838 A | 10/1999 | Shirasaki | 359/577 |
| 5,982,488 A | 11/1999 | Shirasaki | 356/352 |
| 5,999,320 A | 12/1999 | Shirasaki | 359/577 |
| 6,069,718 A * | 5/2000 | Khaleghi | 398/27 |
| 6,493,474 B1 | 12/2002 | Yao | 385/11 |
| 6,646,805 B2 | 11/2003 | Mitamura et al. | 359/578 |
| 6,771,904 B1 * | 8/2004 | Sasaki et al. | 398/25 |
| 6,782,168 B2 | 8/2004 | Hatayama et al. | 385/48 |
| 6,791,685 B2 * | 9/2004 | Youn et al. | 356/327 |

FOREIGN PATENT DOCUMENTS

| | | |
|---|---|---|
| JP | 9-83458 | 3/1997 |
| JP | 9-326755 | 12/1997 |
| JP | 10-206469 | 8/1998 |
| JP | 2002-64430 | 2/2002 |
| JP | 2002-258207 | 9/2002 |
| JP | 2003-8512 | 1/2003 |

* cited by examiner

TRANSMISSION CHARACTERISTICS EVALUATION SYSTEM AND PSEUDO TRANSMISSION PATH APPARATUS THEREOF

This application is a continuation-in-part application, filed under 35 USC 111 (a), of International Application PCT/JP2003/003244, filed Mar. 18, 2003.

BACKGROUND OF THE INVENTION

1) Field of the Invention

The present invention relates to a transmission characteristics evaluation system, and more particularly to a transmission characteristics evaluation system which is suitable, for example, when used in evaluating the characteristics of an optical communication transmission system.

2) Description of the Related Art

It is known in the art that, together with the communication performance of light that is emitted by a laser diode (LD) used in an optical communication system, the signal conversion performances of an electric/optical (E/O) conversion module for converting an electric signal into an optical signal and an optical/electric (O/E) conversion module for converting an optical signal into an electric signal are dependent on the dispersion characteristics of an optical fiber constituting a transmission path.

Particularly, the dispersion tolerance, which is a transmission characteristic of the optical fiber constituting the aforementioned transmission path relative to the magnitude of the amount of dispersion, is a critical index value in evaluating the performance quality of an optical transmitting apparatus provided with an LD or an E/O module or an optical receiving apparatus provided with an O/E module described above.

FIG. 13 is a block diagram illustrating a conventional measurement system for measuring the dispersion tolerance. In this measurement system 200 shown in FIG. 13, an optical transmitting apparatus 210 and an optical receiving apparatus 220 are connected with a dummy fiber 230 which is assumed to be an optical fiber constituting the transmission path in a real optical communication system.

Here, the optical transmitting apparatus 210 is provided with a pattern pulse generator (PPG) 204 together with an E/O module 203 comprising a light source 201 and a modulator 202, whereby an electric signal of a specific pulse pattern generated by the pattern pulse generator 204 of the E/O module 203 is converted into an optical pulse signal by the modulator 202 and is transmitted to the optical receiving apparatus 220 via the aforementioned dummy fiber 230.

Further, the optical receiving apparatus 220 is provided with a receiving amplifier 221, an O/E module 222, and a BER tester (Bit Error Rate tester) 223, whereby the optical pulse signal transmitted via the dummy fiber 230 (and amplified by the receiving amplifier 221) is converted into an electric signal by the O/E module 222, and is output to the BER tester 223 as a received electric signal.

The BER tester 223 performs error detection on the received electric signal relative to the electric signal of the pulse pattern generated by the pulse pattern generator 204 of the optical transmitting apparatus 210. When the dispersion value (fiber length) of the dummy fiber 230 used here is changed, the error rate detected by the BER tester 223 changes. By using this change in the error rate relative to the change in the fiber length, the dispersion tolerance of the optical element, the optical module, and the measurement system can be measured.

In other words, with this error detection value obtained from the BER tester 223, the communication quality of the E/O module 210 and the O/E module 220 relative to the dispersion value of the dummy fiber 230 can be evaluated. In addition, by increasing or decreasing the dispersion value of this dummy fiber 230, the communication quality of the E/O module 210 and the O/E module 220 can be measured as a dispersion tolerance.

Here, in measuring the error detection value by increasing or decreasing the dispersion value of the dummy fiber 230 in the above-described measurement system 200, it is necessary to connect a dummy fiber 230 having a different length newly to the optical transmitting apparatus 210 and the optical receiving apparatus 220 each time the error detection value is measured with the dummy fiber 230.

Recently, there is known a measurement technique that uses a variable dispersion compensator of a Fiber Bragg Grating (FBG) type (optical network simulator manufactured by JDS-Uniphese (US), TeraXion (Canada), or SPIRENT Co., Ltd.) instead of this dummy fiber. These techniques eliminate the need for replacing the dummy fiber 230 in order to increase or decrease the dispersion value of the transmission path, such as in the above-described measurement system 200.

On the other hand, in recent years, in evaluating the transmission characteristics of an optical transmitting apparatus provided with an LD or an E/O module or an optical receiving apparatus provided with an O/E module described above, the insertion loss gradient tolerance, which is the amount of change in the insertion loss of the optical fiber constituting the aforementioned transmission path in accordance with the wavelength of the transmitted light, is considered as one of the index values.

As a technique for measuring this insertion loss gradient tolerance, a variable wavelength bandpass filter module having a bandwidth about ten times larger than the original bandwidth for use is interposed between the optical transmitting apparatus 210 and the optical receiving apparatus 220 such as described above and, by shifting the center wavelength of this filter module, a gradient is given to the distribution of the insertion loss relative to the wavelength of the used transmittance band, and the signal error rate is measured with the BER tester 223.

Namely, the insertion loss gradient tolerance is measured by measuring the signal error rate that changes in accordance with the degree of gradient of the distribution of the insertion loss relative to the wavelength of the used transmittance band.

Here, as a technique related to the present invention, a technique disclosed in the following patent document 1 is known.

[Patent Document 1] Japanese Patent Application Laid-open No. 2002-258207

However, in the case of measuring an index value for evaluating the performance quality of an optical module such as an optical transmitting apparatus provided with an LD and an E/O module or an optical receiving apparatus provided with an O/E module, a technique is demanded having a high measurement precision with reduced number of working steps for the measurement while widening the measurement range as compared with such a conventional technique.

For example, the aforementioned conventional technique for measuring the dispersion tolerance raises a problem in that, in order to perform evaluation of multiple channels, i.e. in order to evaluate the dispersion tolerance of each wavelength in transmitting a wavelength multiplex light, a variable dispersion compensator interposed between the optical transmitting apparatus and the optical receiving apparatus must be prepared separately in accordance with the wavelength of the object of measurement. Moreover, the dispersion value cannot be changed arbitrarily from a positive dispersion value to a negative dispersion value, so that the dispersion tolerance for evaluating the transmission performance of the optical module cannot be measured in a sufficient range.

Also, the aforementioned conventional technique for the measurement of insertion loss gradient tolerance raises a problem in that the insertion loss gradient tolerance cannot be measured commonly in the aforementioned measurement system for measuring the dispersion tolerance. Moreover, when the center wavelength of the bandpass filter module is shifted, a change occurs not only in the value of insertion loss but also in the dispersion value within the band. This makes it difficult to evaluate correctly whether the error detection value detected by the BER tester 223 is due to the change in the dispersion value or due to the change in the value of insertion loss.

SUMMARY OF THE INVENTION

The present invention has been devised in view of the aforementioned problems of the conventional art, and an object thereof is to provide a transmission characteristics evaluation system and a pseudo transmission path apparatus that can measure the dispersion tolerance and the insertion loss gradient tolerance at an improved measurement accuracy with reduced number of working steps for the measurement in evaluating the transmission characteristics of an optical module.

In order to achieve the aforementioned object, the transmission characteristics evaluation system of the present invention is a transmission characteristics evaluation system comprising an optical transmitting apparatus for transmitting an optical signal, an optical receiving apparatus for receiving the optical signal from the optical transmitting apparatus, and a pseudo transmission path apparatus interposed between the optical transmitting apparatus and the optical receiving apparatus, said pseudo transmission path apparatus having transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the optical transmitting apparatus comprises a pulse signal generator for generating an electric pulse signal of a specific pattern and an electric/optical converting section capable of converting the electric pulse signal generated by the pulse signal generator into an optical signal, said optical transmitting apparatus being constructed to transmit the optical signal from the electric/optical converting section as said optical test signal; the pseudo transmission path apparatus comprises an optical element for emitting the signal light transmitted by the optical transmitting apparatus at an output angle that is different depending on a wavelength by subjecting the signal light to multiple reflection for self interference, a lens for converging the signal light emitted from the optical element, a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens, and a transmission characteristics setting section for setting transmission characteristics equivalent to transmission characteristics that the transmission path to which the optical transmitting apparatus and the optical receiving apparatus are to be connected can have, by controlling the mirror or the optical element; and the optical receiving apparatus comprises an optical/electric converting section being capable of converting the optical signal from the optical transmitting apparatus into an electric signal by receiving an input of the optical signal via the pseudo transmission path apparatus in which the transmission characteristics have been set, and a signal error measurement device for measuring a signal error by comparing the electric signal from the optical/electric converting section with the electric pulse signal generated by the optical pulse signal generator, whereby the transmission characteristics of the electric/optical converting section or the optical/electric converting section are evaluated in accordance with the signal error measured by the signal error measurement device of the optical receiving apparatus.

In this case, the electric/optical converting section of the optical transmitting apparatus can be constructed to be capable of converting the electric pulse signal into plural optical signals that are different from each other, and outputting the converted plural optical signals as wavelength multiplex light; the optical/electric converting section of the optical receiving apparatus can be constructed to be capable of converting the optical signals constituting the wavelength multiplex light from the optical transmitting apparatus respectively into electric signals after performing wavelength separation by receiving an input of the optical signals via the pseudo transmission path apparatus in which the transmission characteristics have been set; and the signal error measurement device of the optical receiving apparatus can be constructed to measure the signal error on the electric signals that have been converted after being subjected to the wavelength separation.

Further, the transmission characteristics setting section of the pseudo transmission path apparatus may be constructed with a wavelength dispersion characteristics setting section for setting wavelength dispersion characteristics equivalent to wavelength dispersion characteristics that the transmission path to which the optical transmitting apparatus and the optical receiving apparatus are to be connected can have, by setting an amount of movability of the mirror.

Also, the pseudo transmission path apparatus may be provided with a loss imparting section for imparting a predetermined amount of loss on the signal light that is output from the optical element to the optical receiving apparatus, wherein the transmission characteristics setting section of the pseudo transmission path apparatus can be constructed to comprise a wavelength dispersion characteristics setting section for setting wavelength dispersion characteristics equivalent to wavelength dispersion characteristics that the transmission path to which the optical transmitting apparatus and the optical receiving apparatus are to be connected can have, by controlling the mirror in a movable manner, and a loss amount setting section for setting an amount of loss imparted by the loss imparting section so as to attain loss characteristics equivalent to an amount of loss that the transmission path to which the optical transmitting apparatus and the optical receiving apparatus are to be connected can have.

Further, the pseudo transmission path apparatus may be provided with a loss imparting section for imparting a predetermined amount of loss on the signal light that is output from the optical element to the optical receiving apparatus and an element temperature regulator for regulating an element temperature of the optical element, wherein the transmission characteristics setting section of the pseudo transmission path apparatus may comprise a wavelength dispersion characteristics setting section for setting wavelength dispersion characteristics for each wavelength to be constant by controlling the mirror in a movable manner, and can be constructed to comprise an insertion loss gradient characteristics setting section for setting an amount of loss of the signal light imparted by the loss imparting section and a regulated temperature of the optical element regulated by the element temperature regulator so as to obtain insertion loss gradient characteristics equivalent to insertion loss gradient characteristics that the transmission path can have while maintaining the wavelength dispersion characteristics for each wavelength to be constant by the wavelength dispersion characteristics setting section.

Also, the loss imparting section may be constructed to comprise a variable attenuator for variably attenuating the signal light that is output from the optical element to the optical receiving apparatus and an optical amplifier for amplifying the signal light to the optical receiving apparatus.

Further, the pseudo transmission path apparatus may comprise a polarization mode dispersion imparting section being capable of giving a polarization mode dispersion to the signal light that is returned by the mirror and outputted from the optical element, and the transmission characteristics setting section can set the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

Also, the pseudo transmission path apparatus can be constructed to comprise a non-linear optical effect imparting section being capable of giving a non-linear optical effect to the signal light that is transmitted by the optical transmitting apparatus.

According to another aspect, the pseudo transmission path apparatus in the transmission characteristics evaluation system of the present invention is a pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises: an optical element for emitting the test signal light transmitted by the optical transmitting apparatus at an output angle that is different depending on a wavelength by subjecting the test signal light to multiple reflection for self interference; a lens for converging the signal light emitted from the optical element; a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens; and a transmission characteristics setting section for setting transmission characteristics equivalent to transmission characteristics that the transmission path to which the optical transmitting apparatus and the optical receiving apparatus are to be connected can have, by controlling the mirror or the optical element.

In this case, the pseudo transmission path apparatus in the transmission characteristics evaluation system may comprise a polarization mode dispersion imparting section being capable of giving a polarization mode dispersion to the signal light that is returned by the mirror and outputted from the optical element, wherein the transmission characteristics setting section can set the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

Further, the pseudo transmission path apparatus in the transmission characteristics evaluation system may be constructed to comprise a non-linear optical effect imparting section being capable of giving a non-linear optical effect to the signal light that is transmitted by the optical transmitting apparatus.

According to another aspect, the transmission characteristics evaluation system of the present invention is a transmission characteristics evaluation system comprising an optical transmitting apparatus for outputting an optical signal, an optical receiving apparatus for receiving an input of the optical signal from the optical transmitting apparatus, and a pseudo transmission path apparatus interposed between the optical transmitting apparatus and the optical receiving apparatus, said optical transmitting apparatus having a pulse signal generator for generating an electric pulse signal and an electric/optical converting section capable of converting the electric pulse signal into the optical signal to be output, said optical receiving apparatus having an optical/electric converting section capable of converting the input optical signal into an electric signal and a signal error measurement device for measuring a signal error by comparing the electric signal with the electric pulse signal, wherein said pseudo transmission path apparatus has a variable wavelength dispersion element capable of imparting a different wavelength dispersion to light of a different wavelength and a polarization mode dispersion imparting section capable of giving a polarization mode dispersion to output light of the variable wavelength dispersion element; said variable wavelength dispersion element has an optical element that forms an array of virtual images by allowing a converged input light to propagate between first and second reflection surfaces, wherein light that has been transmitted through one of the reflection surfaces interferes and different wavelengths with a constant wavelength interval are output at a same output angle, a lens for converging the light emitted from the optical element, and a mirror for returning the output light to the optical element via the lens and giving a different wavelength dispersion depending on a reflection position of the light converged by the lens; and said pseudo transmission path apparatus sets transmission characteristics equivalent to transmission characteristics that a transmission path to which the optical transmitting apparatus and the optical receiving apparatus are to be connected can have, by controlling the polarization mode dispersion imparting section together with the mirror or the optical element of the variable wavelength dispersion element.

In this case, the pseudo transmission path apparatus may have a non-linear optical effect imparting section being capable of giving a non-linear optical effect to the signal light that is output from the optical transmitting apparatus.

Further, the transmission characteristics setting section may have a polarization mode dispersion controlling section that controls the polarization mode dispersion given by the polarization mode dispersion imparting section to be equivalent to polarization mode dispersion characteristics that a transmission path to which the optical transmitting apparatus and the optical receiving apparatus are to be connected can have.

According to another aspect, the transmission characteristics evaluation system of the present invention is a transmission characteristics evaluation system comprising an optical transmitting apparatus for outputting an optical signal, an optical receiving apparatus for receiving an input of the optical signal from the optical transmitting apparatus, and a pseudo transmission path apparatus interposed between the optical transmitting apparatus and the optical receiving apparatus, said optical transmitting apparatus having a pulse signal generator for generating an electric pulse signal and an electric/optical converting section capable of converting the electric pulse signal into the optical signal to be output, said optical receiving apparatus having an optical/electric converting section capable of converting the input optical signal into an electric signal and a signal error measurement device for measuring a signal error by comparing the electric signal with the electric pulse signal, wherein said pseudo transmission path apparatus has a variable wavelength dispersion element capable of imparting a different wavelength dispersion to light of a different wavelength and a polarization mode dispersion imparting section capable of giving a polarization mode dispersion to output light of the variable wavelength dispersion element; said variable wavelength dispersion element has an optical element that forms an array of virtual images by allowing a converged input light to propagate between first and second reflection surfaces, wherein light that has been transmitted through one of the reflection surfaces interferes and different wavelengths with a constant wavelength interval are output at a same output angle, a lens for converging the light emitted from the optical element, and a mirror for returning the output light to the optical element via the lens and giving a different wavelength dispersion depending on a reflection position of the light converged by the lens; and said pseudo transmission path apparatus has a non-linear optical effect imparting section being capable of giving a non-linear optical effect to the signal light that is output from the optical transmitting apparatus.

Further, the electric/optical converting section of the optical transmitting apparatus is constructed to be capable of converting the electric pulse signal into plural optical signals that are different from each other, and outputting the converted plural optical signals as wavelength multiplex light; the optical/electric converting section of the optical receiving apparatus is constructed to be capable of converting the optical signals constituting the wavelength multiplex light from the optical transmitting apparatus respectively into electric signals after performing wavelength separation by receiving an input of the optical signals via the pseudo transmission path apparatus in which the transmission characteristics have been set; and the signal error measurement device of the optical receiving apparatus is constructed to measure the signal error on the electric signals that have been converted after being subjected to the wavelength separation.

Also, the transmission characteristics setting section of the pseudo transmission path apparatus may be constructed to comprise a wavelength dispersion characteristics setting section for setting wavelength dispersion characteristics equivalent to wavelength dispersion characteristics that the transmission path to which the optical transmitting apparatus and the optical receiving apparatus are to be connected can have, by setting an amount of movability of the mirror.

Further, in the above-described transmission characteristics evaluation system, the pseudo transmission path apparatus may be provided with a loss imparting section for imparting a predetermined amount of loss on the signal light that is output from the optical element to the optical receiving apparatus, wherein the transmission characteristics setting section of the pseudo transmission path apparatus can comprise a wavelength dispersion characteristics setting section for setting wavelength dispersion characteristics equivalent to dispersion characteristics that the transmission path to which the optical transmitting apparatus and the optical receiving apparatus are to be connected can have, by controlling the mirror in a movable manner, and a loss amount setting section for setting an amount of loss imparted by the loss imparting section so as to attain loss characteristics equivalent to an amount of loss that the transmission path to which the optical transmitting apparatus and the optical receiving apparatus are to be connected can have.

The pseudo transmission path apparatus may be provided with a loss imparting section for imparting a predetermined amount of loss on the signal light that is output from the optical element to the optical receiving apparatus and an element temperature regulator for regulating an element temperature of the optical element, wherein the transmission characteristics setting section of the pseudo transmission path apparatus may comprise a wavelength dispersion characteristics setting section for setting wavelength dispersion characteristics for each wavelength to be constant by controlling the mirror in a movable manner, and may comprise an insertion loss gradient characteristics setting section for setting an amount of loss of the signal light imparted by the loss imparting section and a regulated temperature of the optical element regulated by the element temperature regulator so as to obtain insertion loss gradient characteristics equivalent to insertion loss gradient characteristics that the transmission path can have while maintaining the wavelength dispersion characteristics for each wavelength to be constant by the dispersion characteristics setting section.

Also, the loss imparting section may comprise a variable attenuator for variably attenuating the signal light that is output from the optical element to the optical receiving apparatus and an optical amplifier for amplifying the signal light to the optical receiving apparatus.

According to another aspect, the pseudo transmission path apparatus in the transmission characteristics evaluation system of the present invention is a pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises: an optical element for emitting the test signal light transmitted by the optical transmitting apparatus at an output angle that is different depending on a wavelength by subjecting the test signal light to multiple reflection for self interference; a lens for converging the signal light emitted from the optical element; a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens; a transmission characteristics setting section for setting transmission characteristics equivalent to transmission characteristics that the transmission path to which the optical transmitting apparatus and the optical receiving apparatus are to be connected can have, by controlling the mirror or the optical element; and a polarization mode dispersion imparting section being capable of giving a polarization mode dispersion to the signal light that is returned by the mirror and outputted from the optical element, wherein the transmission characteristics setting section sets the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

According to another aspect, the pseudo transmission path apparatus in the transmission characteristics evaluation system of the present invention is a pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises: an optical element for emitting the test signal light transmitted by the optical transmitting apparatus at an output angle that is different depending on a wavelength by subjecting the test signal light to multiple reflection for self interference; a lens for converging the signal light emitted from the optical element; a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens; a transmission characteristics setting section for setting transmission characteristics equivalent to transmission characteristics that the transmission path to which the optical transmitting apparatus and the optical receiving apparatus are to be connected can have, by controlling the mirror or the optical element; and a non-linear optical effect imparting section being capable of giving a non-linear optical effect to the signal light that is transmitted by the optical transmitting apparatus.

Thus, the present invention provides an advantage in that the measurement of dispersion tolerance in evaluating the transmission characteristics of an electric/optical conversion section of an optical transmitting apparatus or an optical/electric conversion section of an optical receiving apparatus can be carried out at a high precision in a wide range from a positive dispersion value to a negative dispersion value with reduced number of working steps as compared with the measurement in a conventional measurement mode.

Also, the transmission characteristics evaluation system of the present invention provides an advantage in that the measurement of dispersion tolerance in evaluating the transmission characteristics of an electric/optical conversion section of an optical transmitting apparatus or an optical/electric conversion section of an optical receiving apparatus can be carried out at a high precision in a wide range from a positive dispersion value to a negative dispersion value with reduced number of working steps as compared with the measurement in a conventional measurement mode.

In addition, since the dispersion tolerance in multiple channels can be measured, the dispersion tolerance of each wavelength in the transmission of wavelength multiplex light can be easily measured simply by changing the setting with a transmission characteristics setting section instead of preparing a pseudo transmission path apparatus separately in accordance with the wavelength of the object of measurement.

Further, by simply adding a function to the system for measurement of dispersion tolerance, not only the dispersion tolerance but also the insertion loss gradient tolerance can be measured in the common measurement system, so that the mode of use of the transmission characteristics evaluation system or the pseudo transmission path apparatus can be widened, and further the influence of dispersion can be fixed as a measurement condition in measuring the insertion loss gradient tolerance. This provides an advantage in that whether or not the error detection value detected by the signal error measurement device is due to the value of insertion loss can be correctly evaluated.

Further, since the pseudo transmission path apparatus comprises a non-linear optical effect imparting section and a polarization mode dispersion imparting section, the pseudo transmission path apparatus can be allowed to have, in a pseudo manner, the characteristics of non-linear optical effect and polarization mode dispersion which are the characteristics that a real optical transmission path has. This provides an advantage in that the dispersion tolerance can be measured in an environment that is closer to the characteristics that the real transmission path has, thereby outstandingly improving the precision in the measurement of dispersion tolerance.

Also, according to the present invention, by simply adding a function to the system for measurement of dispersion tolerance, not only the dispersion tolerance but also the insertion loss gradient tolerance can be measured in the common measurement system, so that the mode of use of the transmission characteristics evaluation system or the pseudo transmission path apparatus can be widened, and further the influence of dispersion can be fixed as a measurement condition in measuring the insertion loss gradient tolerance. This provides an advantage in that whether or not the error detection value detected by the signal error measurement device is due to the value of insertion loss can be correctly evaluated. Further, since the pseudo transmission path apparatus comprises a non-linear optical effect imparting section and a polarization mode dispersion imparting section, the pseudo transmission path apparatus can be allowed to have, in a pseudo manner, the characteristics of non-linear optical effect and polarization mode dispersion which are the characteristics that a real optical transmission path has. This provides an advantage in that the insertion loss gradient tolerance can be measured in an environment that is closer to the characteristics that the real transmission path has, thereby outstandingly improving the precision in the measurement of insertion loss gradient tolerance as well.

DESCRIPTION OF THE PREFERRED EMBODIMENTS

Hereafter, embodiments of the present invention will be described with reference to the attached drawings.

[a1] Description of the First Embodiment of the Present Invention

Figure 1:
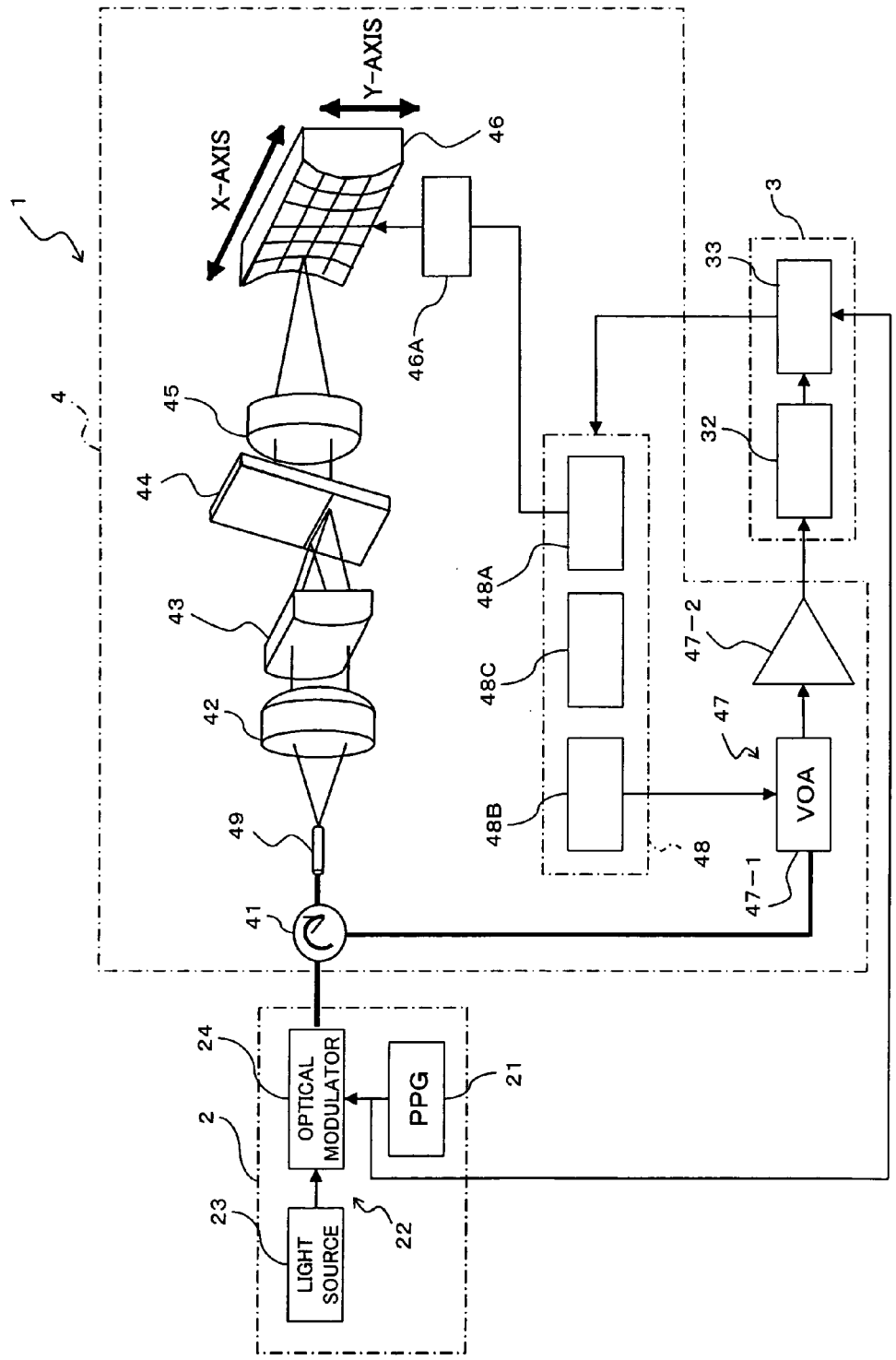
FIG. 1 is a block diagram illustrating a transmission characteristics evaluation system according to the first embodiment of the present invention.

FIG. 1 is a block diagram illustrating a transmission characteristics evaluation system according to the first embodiment of the present invention. This transmission characteristics evaluation system 1 shown in FIG. 1 comprises an optical transmitting apparatus 2 for transmitting an optical signal, an optical receiving apparatus 3 for receiving the optical signal from the optical transmitting apparatus 2, and a pseudo transmission path apparatus 4 interposed between the optical transmitting apparatus 2 and the optical receiving apparatus 3, whereby the transmission characteristics of the optical transmitting apparatus 2 or the optical receiving apparatus 3 are evaluated by transmitting and receiving an optical test signal between the optical transmitting apparatus 2 and the optical receiving apparatus 3.

Here, the optical transmitting apparatus 2 comprises a pattern pulse generator (PPG) 21 serving as a pulse signal generator for generating an electric pulse signal of a specific pattern for testing and an electric/optical conversion section 22 being capable of converting the electric pulse signal generated by the pattern pulse generator 21 into an optical signal, whereby the optical signal from the electric/optical conversion section 22 is transmitted as an optical signal for testing.

Here, the electric/optical conversion section 22 is constructed to comprise a light source 23 such as an LD (Laser Diode) and a modulator 24 that modulates the continuous light (monowavelength light) from the light source 23 with an electric pulse signal from the PPG 21. This electric/optical conversion section 22 can be constructed with an LD that emits an optical pulse signal on the basis of an electric pulse signal from the PPG 21.

The pseudo transmission path apparatus 4 has, in a pseudo manner, the transmission characteristics of a transmission path to which the electric/optical conversion section 22 of the optical transmitting apparatus 2 and the optical/electric conversion section 32 of the optical receiving apparatus 3 are to be connected. The pseudo transmission path apparatus 4 is constructed to comprise an optical circulator 41, a collimating lens 42, a line focus lens (cylindrical lens) 43, an optical element 44, a focusing lens 45, a three-dimensional free curved-surface mirror 46, a variable optical attenuator (hereafter referred to as VOA) 47-1, an optical amplifier 47-2, an actuator 46A, and a controller 48.

Here, the optical circulator 41 emits the optical signal transmitted from the electric/optical conversion section 22 to the collimating lens 42 mentioned later, and emits the optical signal coming from the collimating lens 42 to the VOA 47-1.

In other words, the optical signal that has been input into the optical circulator 41 from the optical transmitting apparatus 2 passes through the collimating lens 42, the line focus lens 43, the optical element 44, and the focusing lens 45 mentioned later to be reflected by the three-dimensional free curved-surface mirror (which may hereafter be simply referred to as mirror) 46, and the reflected return light that has travelled through the path in an opposite direction to be incident into the optical circulator 41 is emitted to the VOA 47-1.

Here, when paying attention to the optical signal from the optical circulator 41 until being reflected by the three-dimensional free curved-surface mirror 46, the collimating lens 42 receives incidence of the signal light from the optical transmitting apparatus 2 as a radiated light that is radiated from an optical fiber end portion 49 connected to the optical circulator 41 and converts (collimates) this radiated light into parallel light.

The line focus lens 43 converts the parallel light from the collimating lens 42 into line focus light (light whose focuses are distributed along a line) that is incident into the optical element 44. Further, the optical element 44 emits the signal light transmitted from the optical transmitting apparatus at an output angle that is different depending on a wavelength by subjecting the signal light to multiple reflection for self interference.

Figure 2:
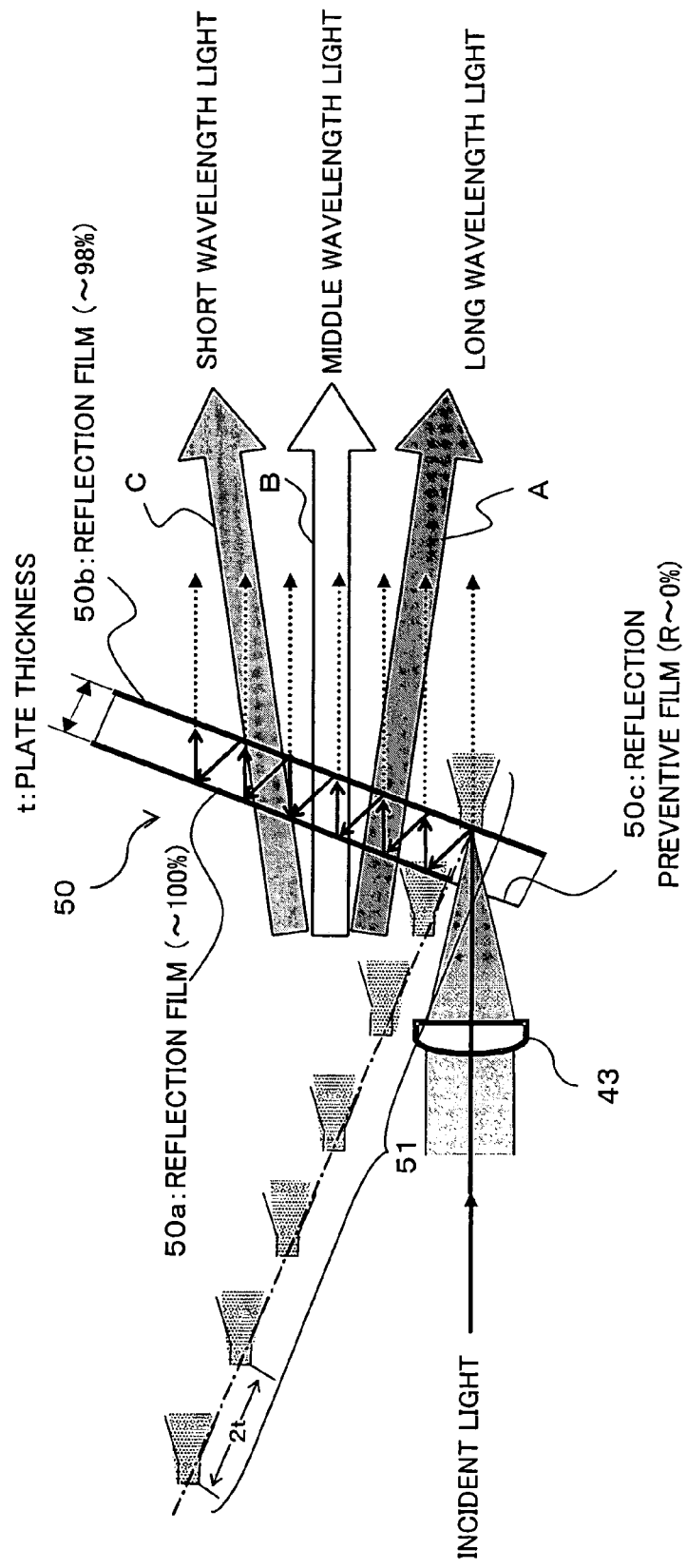
FIGS. 2 and 3 both are model views illustrating the function of an optical element.

FIG. 2 is a model view illustrating how the above-described line focus light incident from the line focus lens 43 undergoes multiple reflection by the optical element 44 for self interference in the optical element 44, whereby the output light is dispersed and output at an output angle that is different dependent on the wavelength in a substantially linear dispersion direction (direction parallel to the Y-axis of the mirror 46 in FIG. 1). As illustrated in this FIG. 2, the light having a comparatively longer wavelength is emitted in the direction of A in FIG. 2; the light having a middle wavelength is emitted in the direction of B in FIG. 2; and the light having a shorter wavelength is emitted in the direction of C in FIG. 2.

Here, the optical element 44 is constituted of a parallel flat plate 50 having a plate thickness of t and having three films 50a, 50b, and 50c formed on the surfaces thereof. Here, the film 50c functions as a reflection preventive film (having a reflectivity of about 0%) for optically coupling the line focus lens 43 with the optical element 44; the film 50b is a reflection film formed on a surface opposite to the later-mentioned film 50a and having a reflectivity lower than 100% (for example, about 98%); and the film 50a is a reflection film formed on the same surface as the film 50c and having a reflectivity of about 100%.

Namely, the light from the line focus lens 43 passes through the reflection preventive film 50c serving as a transmittance region to be incident into the reflection film 50b disposed at the focal distance from the line focus lens 43, whereby a part of the light is emitted and the rest of the light is reflected by the reflection film 50a and successively undergoes multiple reflection at points located away from the point of incidence of the line focus lens 43 in FIG. 2 by the reflection film 50a and the reflection film 50b.

By this, the lights emitted from the reflection film 50b of the optical element 44 are equivalent to a form that widens from virtual images 51 of beam waist. The virtual images 51 are arranged in a ladder form at a constant interval of 2t along the line perpendicular to the parallel plate 50. The lights from the virtual images 51 thus arranged in a ladder form interfere with each other to undergo self interference, and become lights in a line form having angles that are different from each other depending on the wavelength.

Namely, the light having a comparatively short wavelength becomes light in a line form having an angle shown by the arrow A in FIG. 2; the light having a comparatively long wavelength becomes light in a line form having an angle shown by the arrow C in FIG. 2; and the light having a middle wavelength becomes light in a line form having an angle shown by the arrow B in FIG. 2.

Here, the self interference represents interference that occurs among a plurality of lights or light beams that are generated from one and the same light source. Namely, the lights emitted from the reflection film 50b will be equivalent to the lights that widen from the virtual images 51 arranged in a ladder form (having the same light source), so that the lights from these virtual images 51 undergo self interference to be emitted at an angle that is different for each wavelength.

An optical element that forms virtual images thus arranged in a ladder form is referred to as a Virtually Imaged Phased Array, and is generally called also as a VIPA element.

Figure 3:
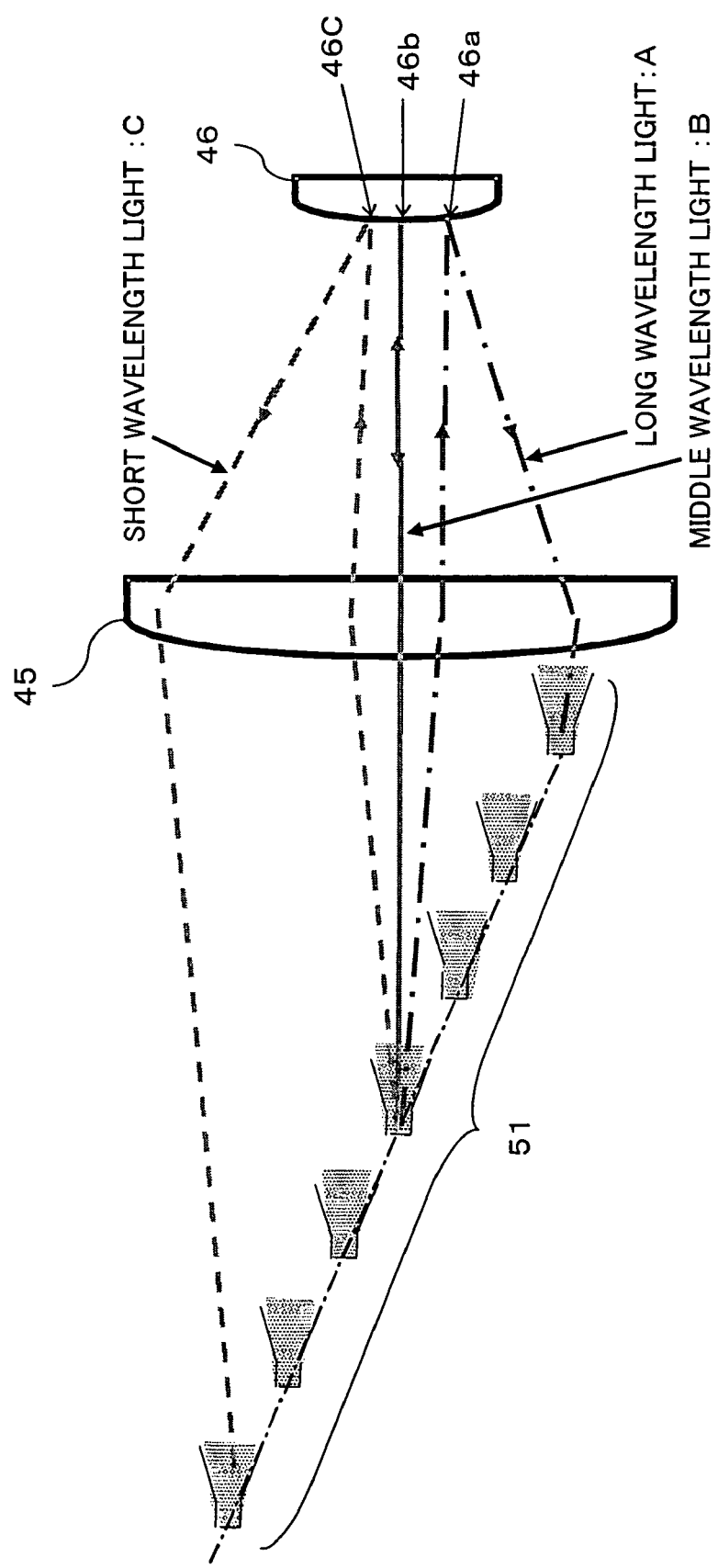

The focusing lens 45 converges the signal light in a line form radiated from the optical element 44 in a point form on the surface of the mirror 46 at the subsequent step. Namely, regarding the light in a line form (band-shaped light) parallel to the X-axis of the mirror 46 in FIG. 1, the long-wavelength light A shown in FIG. 3 is converged in a point form at around the point 46a on the mirror 46; the middle-wavelength light B is converged in a point form at around the point 46b on the mirror 46; and the short-wavelength light C shown in FIG. 3 is converged in a point form at around the point 46c on the mirror 46.

The mirror 46 reflects the light from the focusing lens 45 and emits the reflected return light to the focusing lens 45. More specifically, the mirror 46 reflects and returns the signal light converged by the focusing lens 45 to the lens 45 so that the returned signal light (reflected return light) undergoes multiple reflection in the optical element 44 to be output as signal light to the optical receiving apparatus 4, and is capable of giving a different wavelength dispersion to the above-described signal light to the optical receiving apparatus depending on the reflection surface position of the signal light converged by the lens 45.

Here, the reflection surface of the mirror 46 is constructed to have a three-dimensional curved surface that provides an arbitrarily adjustable reflection angle of the above-described reflected return light when the incidence position of the light from the focusing lens 45 is changed (moved) by driving of the actuator 46A.

Namely, since the reflection angle of the reflected return light relative to the light from the focusing lens 45 can be adjusted by driving of the actuator 46A, the incidence position of this reflected return light on the reflection film 50b in the optical element 44 can also be set. Namely, in accordance with the incidence position of this reflected return light on the reflection film 50b in the optical element 44, a difference in the optical path length by the multiple reflection of the returned reflection light in the parallel flat plate 50 can be provided.

In the pseudo transmission path apparatus 4 according to the first embodiment of the present invention, an optical path length difference of the reflected return light can be provided for each wavelength of the incident light by adjusting the reflection angle of the mirror 46 having an incident light position (coordinate value on the Y-axis) that is different for each wavelength, by moving the mirror 46 in parallel to the X-axis by driving of the actuator 46A. This makes it possible to give wavelength dispersion characteristics that a real transmission path to which the electric/optical conversion section 22 of the optical transmitting apparatus 2 and the optical/electric conversion section 32 of the optical receiving apparatus 3 are to be connected can have.

Here, the reflected return light in which an optical path length difference has been provided for each wavelength in the optical element 44 passes through the line focus lens 43 and the collimating lens 42 to be incident again into the optical fiber end portion 49, and is output to the VOA 47-1 via the optical circulator 41. Therefore, it is possible to obtain wavelength dispersion characteristics that an actually connected transmission path can have, by the optical system constituted of the collimating lens 42, the line focus lens 43, the optical element 44, the focusing lens 45, and the mirror 46 described above.

The VOA 47-1 and the optical amplifier 47-2 collaborate with each other to adjust the optical strength so as to obtain a loss equivalent to that given by the real transmission path on the optical signal coming from the optical circulator 41 and having a dispersion equivalent to the dispersion that the actually connected transmission path can have. The VOA 47-1 attenuates the light by an attenuation amount that is set by the controller 48, and the optical amplifier 47-2 amplifies the light at an amplification ratio that is set by the controller 48.

By this, the optical signal that is output from the optical amplifier 47-2 is input into the optical receiving apparatus 3 as an output signal of the pseudo transmission path apparatus 4 serving as a pseudo (simulated) transmission path, while having wavelength dispersion characteristics and loss characteristics equivalent to those of an actually connected transmission path as described above. Therefore, the VOA 47-1 and the optical amplifier 47-2 described above function as a loss imparting section that gives a predetermined amount of loss to the signal light that is output from the optical element 44 and input into the optical receiving apparatus 3.

The controller 48 is constituted, for example, of a processor or the like and is linked to the optical transmitting apparatus 2 and the optical receiving apparatus 3 in the transmission characteristics evaluation system 1, for example, through the intermediary of a GPIB (General Purpose Interface Bus) so as to control the measurement system as a whole.

Namely, the controller 48 functions as a transmission characteristics setting section that sets transmission characteristics equivalent to the transmission characteristics that a real transmission path to which the electric/optical conversion section 22 of the optical transmitting apparatus 2 and the optical/electric conversion section 32 of the optical receiving apparatus 3 described above are to be connected can have, by setting the amount of control on the mirror 46 or the optical element 44. The controller 48 comprises a reflection position setting section 48A, a loss amount setting section 48B, and a transmission characteristics evaluating section 48C.

Here, the reflection position setting section 48A controls the actuator 46A that adjusts the above-described reflection position of the optical signal on the mirror 46, and functions as a wavelength dispersion characteristics setting section that sets wavelength dispersion characteristics equivalent to the wavelength dispersion characteristics that a real transmission path to which the optical transmitting apparatus 2 and the optical receiving apparatus 3 are to be connected can have, by setting an amount of movability of the mirror 46. The loss amount setting section 48B sets the attenuation amount and the amplification ratio of the signal light provided respectively by the VOA 47-1 and the optical amplifier 47-2 so as to give loss characteristics equivalent to the loss amount that a real transmission path to which the optical transmitting apparatus 2 and the optical receiving apparatus 3 are to be connected can have.

Further, the optical receiving apparatus 3 receives the optical signal that has been transmitted by the optical transmitting apparatus 2 described above as an optical signal that has been modulated by the pseudo transmission path apparatus 4 into an optical signal equivalent to an optical signal transmitted through a transmission path that is to be actually connected. The optical receiving apparatus 3 is constructed to comprise an optical/electric conversion section 32 and a signal error measuring device 33.

Namely, the optical/electric conversion section 32 receives an input of the optical signal transmitted by the optical transmitting apparatus 2 via the pseudo transmission path apparatus 4 in which the transmission characteristics have been set, and is capable of converting the optical signal into an electric signal. The optical/electric conversion section 32 is constructed, for example, with a photodiode or the like. The BER tester (signal error measuring device) 33 measures a signal error by comparing the electric signal from the optical/electric conversion section 32 with the electric pulse signal generated by the pattern pulse generator 21. The measurement results are output to the controller 48, for example, via the GPIB.

Also, the transmission characteristics evaluating section 48C of the controller 48 determines the dispersion tolerance (wavelength dispersion tolerance) as a transmission evaluation result obtained by the electric/optical conversion section 22 or the optical/electric conversion section 32 on the basis of the above-described signal error measured by the BER tester 33.

Namely, when the specification of the optical/electric conversion section 32 is fixed, the BER tester 33 can measure the signal error for evaluating the transmission characteristics according to the specification of the electric/optical conversion section 22. Conversely, when the specification of the electric/optical conversion section 22 is fixed, the BER tester 33 can measure the signal error for evaluating the transmission characteristics according to the specification of the optical/electric conversion section 32.

In the transmission characteristics evaluation system 1 according to the first embodiment of the present invention having the above-described construction, the signal light obtained by modulation of light having a predetermined wavelength from the light source 23 with the PPG 21 is received by the optical receiving apparatus 3 via the pseudo transmission path apparatus 4; the BER tester 33 of the optical receiving apparatus 3 measures the signal error of the received optical signal; and the controller 48 determines the dispersion tolerance as transmission characteristics on the basis of the measured value.

At this time, in the optical circulator 41 of the pseudo transmission path apparatus 4, the optical signal received from the optical transmitting apparatus 2 passes through the collimating lens 42, the line focus lens 43, the optical element 44, and the focusing lens 45 to be reflected by the three-dimensional free curved-surface mirror (hereafter referred to simply as a mirror) 46 and the reflected return light that has travelled through the path in the opposite direction to be incident into the optical circulator 41 is emitted to the VOA 47-1.

The reflection position setting section 48A of the controller 48 varies the dispersion amount of the reflected return light continuously from a positive dispersion value to a negative dispersion value by variably adjusting the reflection position of the mirror 46 continuously along the X-axis of FIG. 1. Here, the attenuation amount of the VOA 47-1 and the amplification ratio of the optical amplifier 47-2 by the loss amount setting section 48B are set so as to obtain the loss characteristics of a transmission path in an optical communication system in which the electric/optical conversion section 22 of the optical transmitting apparatus 2 and the optical/electric conversion section 32 of the optical receiving apparatus 3 are to be actually employed.

By this, the optical receiving apparatus 3 can receive the signal light with varied dispersion amount, and the BER tester 33 measures the signal error measurement value on the received optical signal having this varied dispersion value. Further, the transmission characteristics evaluating section 48C accumulates the signal error measurement values from the BER tester 33 in correspondence with the dispersion values, so as to determine the dispersion tolerance.

By such a variable adjustment of the reflection position of the mirror 46, a dispersion amount can easily be set in an extremely wide range from a positive dispersion value to a negative dispersion value that a real transmission path can have, as compared with a conventional technique of performing variable setting of the dispersion value by using a fiber grating. Also, since the mirror 46 surface has a smooth curved surface so that the reflection angle can be continuously varied, the dispersion amount can be set in a highly precise manner by performing fine adjustment of the reflection position of the mirror 46.

Thus, the transmission characteristics evaluation system according to the first embodiment of the present invention provides an advantage in that the measurement of dispersion tolerance in evaluating the transmission characteristics of the electric/optical conversion section 22 or the optical/electric conversion section 32 serving as an optical module can be carried out at a high precision in a wide range from a positive dispersion value to a negative dispersion value with reduced number of working steps as compared with the measurement carried out by laying a dummy fiber.

Here, in the above-described first embodiment of the present invention, the PPG 21 is connected to an E/O (Electric/Optic) module serving as the electric/optical conversion section 22; however, according to the present invention, the PPG 21 may be connected directly to the LD serving as the light source, and the optical signal obtained by modulation of the pulse signal from the PPG 21 may be output. In this case, the transmission characteristics evaluation result can be determined as the dispersion tolerance of the LD itself.

Also, in the above-described first embodiment of the present invention, the VOA 47-1 and the optical amplifier 47-2 are provided so that the loss characteristics will be equivalent to those of a real transmission path; however, according to the present invention, the setting of the loss characteristics by the VOA 47-1 and the optical amplifier 47-2 may be omitted as long as at least the wavelength dispersion characteristics can be varied to values that the real transmission path would measure. In this way also, the advantages such as described above can be obtained.

[a2] Description of a Modified Example of the First Embodiment of the Present Invention In the above-described first embodiment, the optical transmitting apparatus 2 is provided with an electric/optical conversion section 22 for outputting an optical signal of a single wavelength (monowavelength), and the optical receiving apparatus 3 is provided with an optical/electric conversion section 32 for receiving the optical signal of the single wavelength from the optical transmitting apparatus 2, whereby the dispersion tolerance is measured by transmitting and receiving the optical signal of the single wavelength. However, the present invention is not limited to this, so that the transmission characteristics evaluation system 1A can be constructed, for example, by connecting an optical transmitting apparatus 2A and an optical receiving apparatus 3A having a construction such as illustrated in FIG. 4 to the pseudo transmission path apparatus 4.

Figure 4:
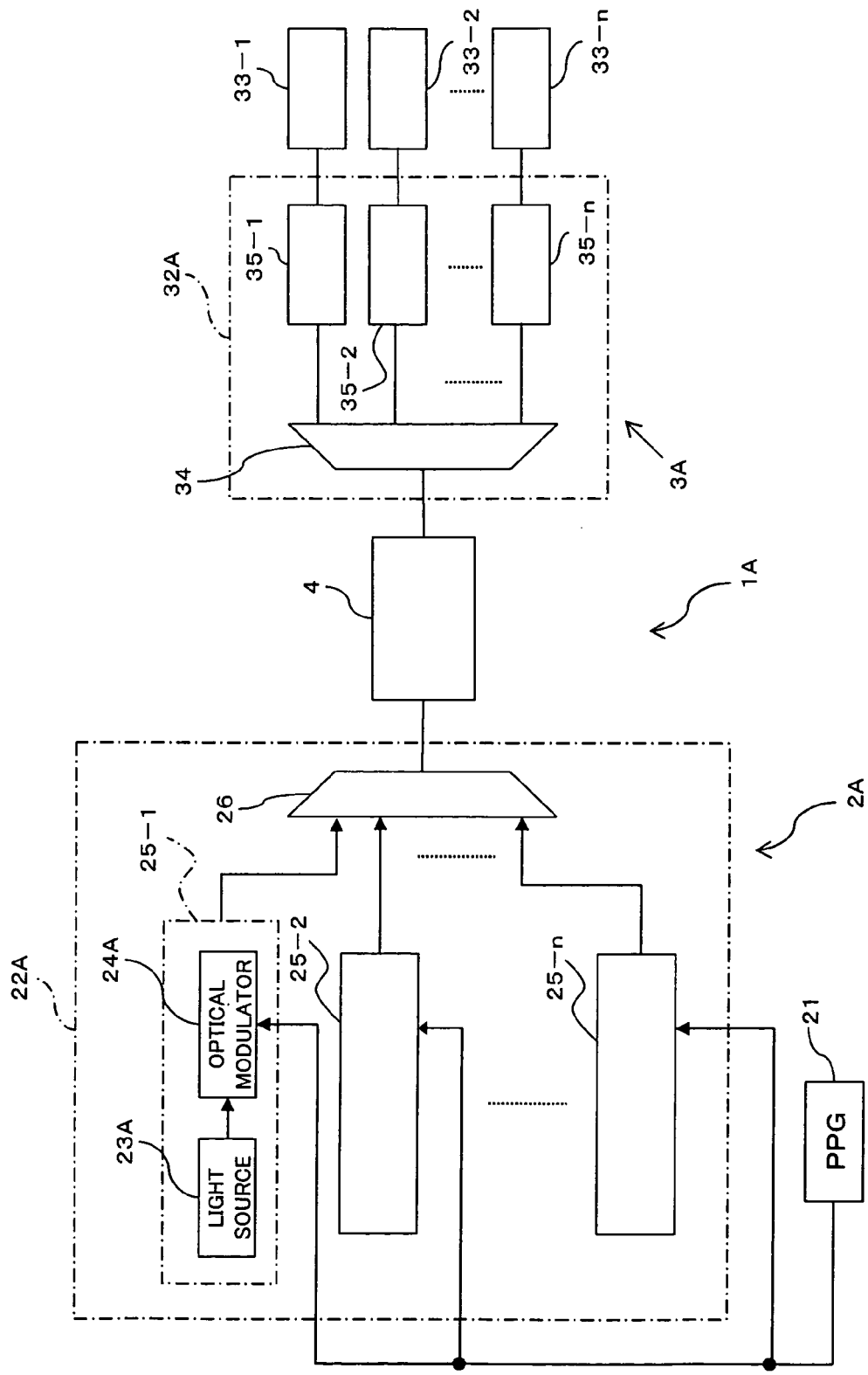
FIG. 4 is a block diagram illustrating a transmission characteristics evaluation system according to a modified example of the first embodiment of the present invention.

Here, in FIG. 4, the reference numeral 4 represents a pseudo transmission path apparatus similar to the that of the above-described first embodiment, and the controller (See the reference numeral 48 in FIG. 1) of the pseudo transmission path apparatus 4 is linked to the optical transmitting apparatus 2A and the optical receiving apparatus 3A by a controlling line in the same manner as in the above-described first embodiment; however, the illustration thereof is omitted in FIG. 4.

Here, the optical transmitting apparatus 2A of this transmission characteristics evaluation system 1A illustrated in FIG. 4 comprises an electric/optical conversion section 22A for converting an electric pulse signal into plural optical signals that are different from each other and outputting the converted plural optical signals as a wavelength multiplex light, and a PPG 21 similar to that of the above-described first embodiment. This electric/optical conversion section 22A is constructed to comprise plural light-emitting modules 25-1 to 25-n capable of outputting optical signals modulated with the electric pulse signal from the PPG 21 and having wavelengths that are different from each other, and a wavelength multiplexing section 26 for performing wavelength multiplexing on the optical signals from the light-emitting modules 25-1 to 25-n and transmitting the wavelength-multiplexed light.

Here, the above-described light-emitting modules 25-1 to 25-n are each constituted to comprise a light source for outputting continuous light of a wavelength that is different from each other and a modulator for modulating the continuous light from the light source with the electric pulse signal from the PPG 21 (See the reference numerals 23A and 24A of the light-emitting module 25-1); however, the light-emitting modules 25-1 to 25-n may be constituted of an LD for outputting an optical signal modulated with the electric pulse signal from the PPG 21.

Further, the optical receiving apparatus 3 is constituted to comprise an optical/electric conversion section 32A capable of converting the optical signals constituting the wavelength multiplex light from the optical transmitting apparatus 2A respectively into electric signals after performing wavelength separation by receiving an input of the optical signals via the pseudo transmission path apparatus 4 in which the transmission characteristics have been set, and plural BER testers 33-1 to 33-n for measuring a signal error on the respective signals converted into electric signals on the basis of the electric pulse signal from the PPG 21.

Here, the above-described optical/electric conversion section 32A is constituted to comprise a wavelength separating section 34 for performing wavelength separation on the wavelength-multiplexed light from the pseudo transmission path apparatus 4, and plural light-receiving modules 35-1 to 35-n for converting the signal lights subjected to wavelength separation by the wavelength separating section 34 into electric signals.

By the above-described construction, in the transmission characteristics evaluation system 1A according to the modified example of the first embodiment of the present invention, the wavelength-multiplexed light (modulated by the PPG 21) is received from the optical transmitting apparatus 2A by the optical receiving apparatus 3A via the pseudo transmission path apparatus 4, and the BER testers 33-1 to 33-n of this optical receiving apparatus 3A measures the signal error of the received optical signals to determine the dispersion tolerance as the transmission characteristics.

At this time, among the plural BER testers 33-1 to 33-n for respectively measuring the signal error of the optical signals of plural wavelengths, by measuring the signal error while paying attention to the light of one wavelength each and varying the dispersion amount of the light of each wavelength by adjusting the reflection position of the mirror 46 with the reflection position setting section 48A, the dispersion tolerance of each wavelength in the case of transmitting a wavelength multiplexed light can be easily measured simply by changing the setting with the controller 48 without separately preparing a pseudo transmission path apparatus in correspondence with the wavelength constituting an object of measurement.

At this time, the reflection position setting section 48A of the controller 48 in the pseudo transmission path apparatus 4 varies the dispersion amount of the reflected return light in the wavelength light constituting the object of measurement continuously from a positive dispersion value to a negative dispersion value by variably adjusting the reflection position of the mirror 46 continuously along the X-axis of FIG. 1.

Here, the attenuation amount of the VOA 47-1 and the amplification ratio of the optical amplifier 47-2 by the loss amount setting section 48B are set so as to obtain the loss amount of a transmission path in an optical communication system in which the electric/optical conversion section 22A of the optical transmitting apparatus 2A and the optical/electric conversion section 32A of the optical receiving apparatus 3A are to be actually employed, in the same manner as in the above-described first embodiment.

By this, the optical receiving apparatus 3A can receive the wavelength-multiplexed light in which the dispersion amount for the wavelength light constituting the object of measurement is continuously varied by a predetermined amount, and the BER tester 33 measures the signal error measurement value on the received optical signal having this varied dispersion value. Further, the transmission characteristics evaluating section 48C accumulates the signal error measurement values from the BER tester 33 in correspondence with the dispersion values, so as to determine the dispersion tolerance.

In this manner, the transmission characteristics evaluation system according to the modified example of the first embodiment of the present invention provides an advantage similar to that of the above-described first embodiment and, in addition to this, provides the following advantage. Namely, since the dispersion tolerance in multiple channels can be measured, the dispersion tolerance of each wavelength in the case of transmitting a wavelength multiplexed light can be easily measured simply by changing the setting with the controller 48 without separately preparing a pseudo transmission path apparatus 4 in correspondence with the wavelength constituting an object of measurement.

[b] Description of the Second Embodiment of the Present Invention

In the above-described first embodiment of the present invention, the optical transmitting apparatus 2 comprises an electric/optical conversion section 22 for outputting an optical signal of a single wavelength, and the optical receiving apparatus 3 comprises an optical/electric conversion section 32 for receiving the optical signal of the single wavelength from the optical transmitting apparatus 2, whereby the dispersion tolerance of the electric/optical conversion section 22 or the optical/electric conversion section 32 is measured by transmitting and receiving the optical signal of the single wavelength. In the transmission characteristics evaluation system 100 according to the second embodiment, an insertion loss gradient tolerance is measured as a transmission characteristic of the electric/optical conversion section 22 or the optical/electric conversion section 32.

Figure 5:
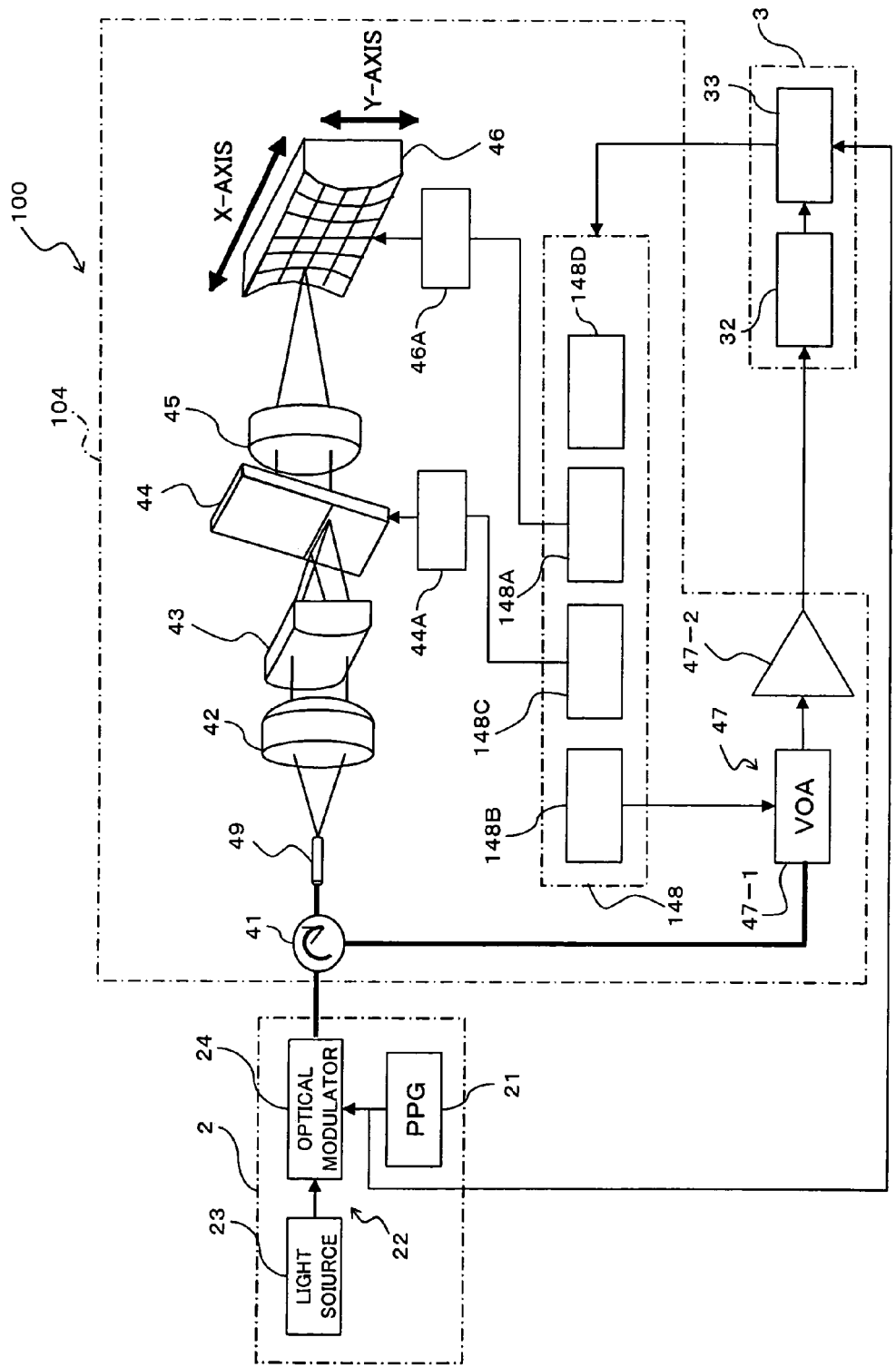
FIG. 5 is a block diagram illustrating a transmission characteristics evaluation system according to the second embodiment of the present invention.

FIG. 5 is a view illustrating a transmission characteristics evaluation system 100 according to the second embodiment of the present invention. This transmission characteristics evaluation system 100 shown in FIG. 5 comprises an optical transmitting apparatus 2 for transmitting an optical signal, an optical receiving apparatus 3 for receiving the optical signal from the optical transmitting apparatus 2, and a pseudo transmission path apparatus 104 interposed between the optical transmitting apparatus 2 and the optical receiving apparatus 3, whereby the transmission characteristics of the optical transmitting apparatus 2 or the optical receiving apparatus 3 are evaluated by transmitting and receiving an optical test signal between the optical transmitting apparatus 2 and the optical receiving apparatus 3, in the same manner as in the first embodiment.

Here, the optical transmitting apparatus 2 and the optical receiving apparatus 3 in the transmission characteristics evaluation system 100 shown in FIG. 5 have a construction similar to those of the above-described first embodiment, and a detailed description thereof will be omitted.

In contrast to the pseudo transmission path apparatus 4 in the above-described first embodiment, the pseudo transmission path apparatus 104 interposed between the optical transmitting apparatus 2 and the optical receiving apparatus 3 serves to measure the insertion loss gradient tolerance instead of the dispersion tolerance of the optical transmitting apparatus 2 or the optical receiving apparatus 3, relative to the dispersion amount that a transmission path to which the optical transmitting apparatus 2 and the optical receiving apparatus 3 are to be connected can have.

For this purpose, the pseudo transmission path apparatus 104 in the second embodiment of the present invention is constructed to comprise an element temperature regulator 44A and a controller 148 as well as an optical circulator 41, a collimating lens 42, a line focus lens 43, an optical element 44, a focusing lens 45, a three-dimensional free curved-surface mirror 46, a VOA 47-1, an optical amplifier 47-2, and an actuator 46A similar to those of the above-described first embodiment.

Here, the controller 148 is constructed, for example, with a processor or the like, and is linked to the optical transmitting apparatus 2 and the optical receiving apparatus 3 in the transmission characteristics evaluation system 1, for example, via a GPIB (General Purpose Interface Bus) to control the measurement system as a whole. The controller 148 has a function as a transmission characteristics setting section for setting transmission characteristics equivalent to the transmission characteristics that a transmission path to which the optical transmitting apparatus 2 and the optical receiving apparatus 3 are to be connected can have. Further, the controller 148 comprises a wavelength dispersion characteristics setting section 148A and an insertion loss gradient characteristics setting section 148E together with a transmission characteristics evaluating section 148D.

Here, the wavelength dispersion characteristics setting section 148A and the insertion loss gradient characteristics setting section 148E constitute a transmission characteristics setting section, and the wavelength dispersion characteristics setting section 148A sets the wavelength dispersion characteristics for each wavelength to be constant by movably controlling the mirror 46 through the intermediary of an actuator 46A.

Also, the insertion loss gradient characteristics setting section 148E sets the loss amount of the signal light by the VOA 47-1 and the optical amplifier 47-2 and the regulated temperature of the optical element 44 by the element temperature regulator 44A so as to obtain insertion loss gradient characteristics equivalent to the insertion loss gradient characteristics that the transmission path can have, while maintaining the above-described wavelength dispersion characteristics for each wavelength to be constant by the wavelength dispersion characteristics setting section 148A. The insertion loss gradient characteristics setting section 148E comprises a loss amount setting section 148B and an element temperature setting section 148C.

Figure 6:
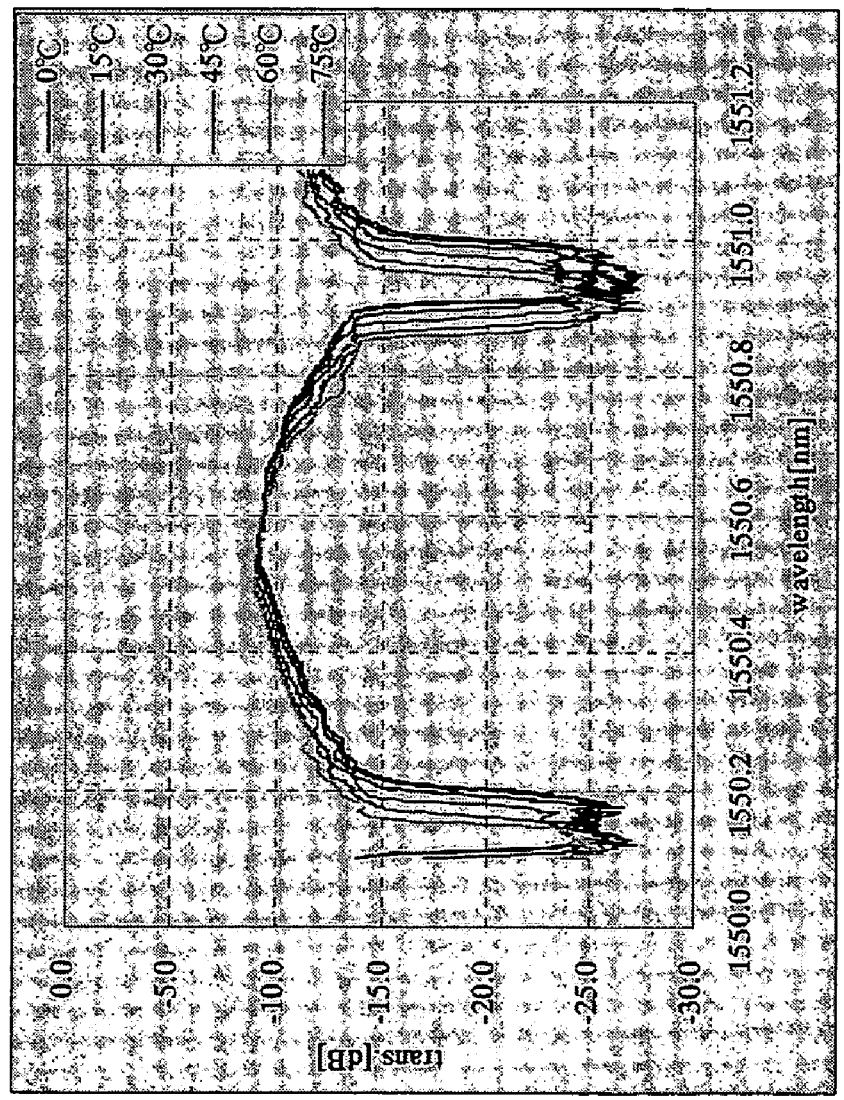
FIGS. 6, 7A, 7B, 8A, and 8B all are views for describing the operation of an insertion loss gradient characteristics setting section.
Figure 7A:
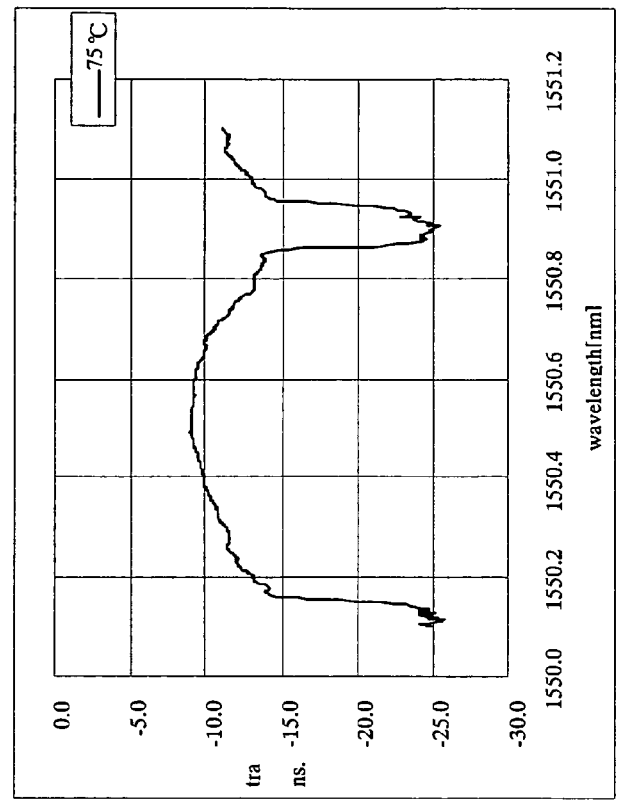
Figure 7B:
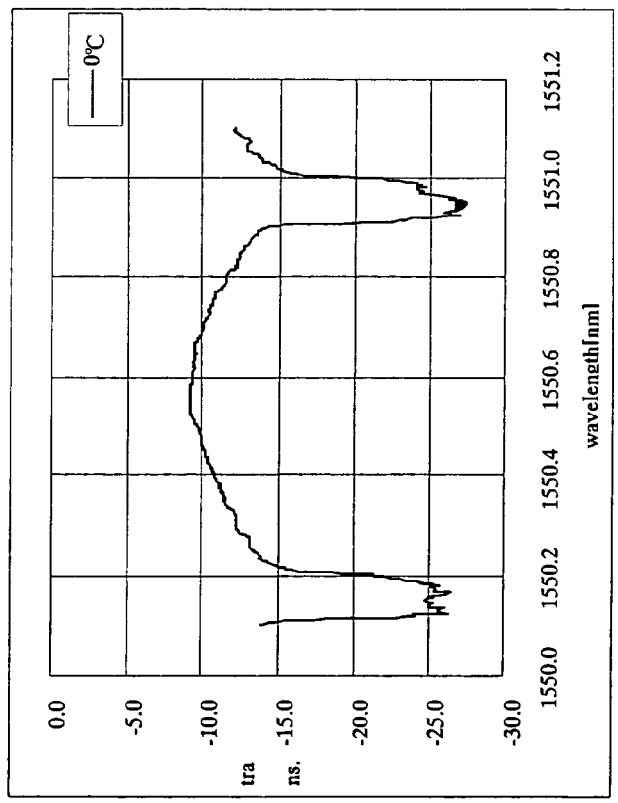

FIGS. 6, 7A, 7B, 8A, and 8B all are views for describing an operation of the above-described insertion loss gradient characteristics setting section 148E. The optical element 44 has wavelength transmittance characteristics that change as illustrated in FIG. 6 by regulation of the temperature within a range of, for example, 0° C. to 75° C. by being warmed or cooled by the element temperature regulator 44A. Here, FIG. 7A shows wavelength transmittance characteristics in the case of the temperature being 0° C., and FIG. 7B shows wavelength transmittance characteristics in the case of the temperature being 75° C.

Namely, when the temperature of the optical element 44 is raised, the transmittance center wavelength shifts to the shorter wavelength side while the waveform itself of the total transmittance characteristics is maintained to be substantially constant, as illustrated in these FIGS. 6, 7A, and 7B. In other words, the portion around the wavelength of 1550.6 nm having transmittance characteristics that are substantially flat at 0° C. can be made to have transmittance characteristics that are inclined (gradient) in a rightwardly descending manner by warming the optical element 44 to have a temperature of 75° C.

Also, the VOA 47-1 and the optical amplifier 47-2 collaborate with each other to increase or decrease the transmittance characteristics such as shown in FIGS. 6, 7A, and 7B in the total wavelength region, where the VOA 47-1 attenuates the transmittance characteristics in the total wavelength region, and the optical amplifier 47-2 amplifies the transmittance characteristics in the total wavelength region.

Namely, the transmittance characteristics such as shown in FIGS. 6, 7A, and 7B can be attenuated or amplified in a predetermined ratio over the total wavelength region. In other words, the waveform level can be moved up and down while the waveform itself of the total transmittance characteristics is maintained to be substantially constant. Therefore, the above-described VOA 47-1 and the optical amplifier 47-2 function as a loss imparting section for giving a predetermined amount of loss to the signal light that is outputted from the optical element 44 to the optical receiving apparatus 3.

The "insertion loss" represents a loss portion produced when a relay element constituting a transmission path to which the optical transmitting apparatus 2 and the optical receiving element 3 are to be connected is inserted (interposed) between the optical fibers. The "insertion loss gradient tolerance" represents the degree by which the optical signals can be transmitted when the above-described insertion loss is in a state in which the waveform of the transmittance characteristics around the wavelength band of the optical signals used as transmission signals is inclined.

Here, in inclining the waveform of the above-described transmittance characteristics around the wavelength band of the optical signals used as transmission signals, the attenuation amount by the VOA 47-1 and the amplification ratio by the optical amplifier 47-2 described above are set by the loss amount setting section 148B, and the regulated temperature of the element temperature regulator 44A for regulating the temperature of the optical element 44 is set by the element temperature setting section 148C. Namely, the gradient (inclination) of the transmittance characteristics around the wavelength band of the optical signals used as transmission signals can be increased or decreased while the waveform of the transmittance characteristics such as shown in FIGS. 6, 7A, and 7B is moved up and down and to the right and left.

Figure 8A:
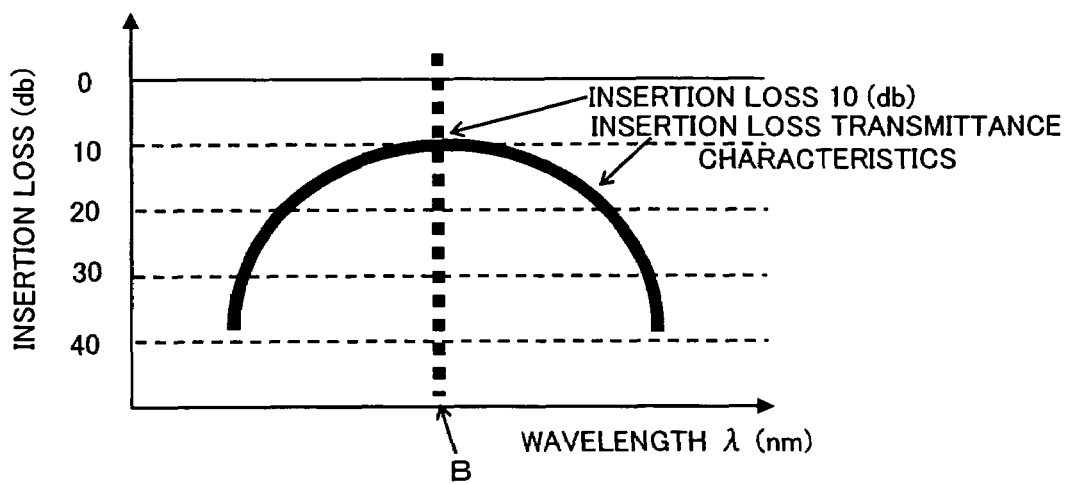
Figure 8B:
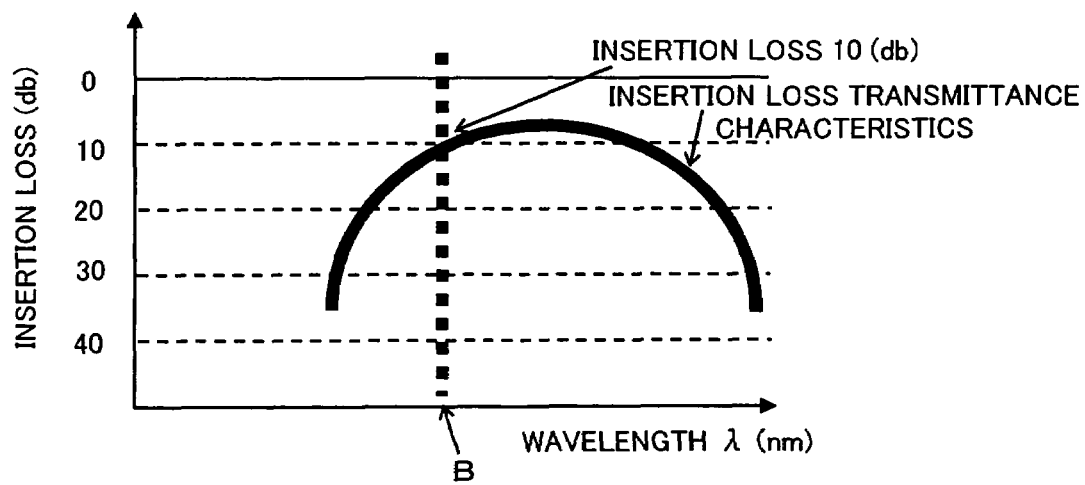

For example, when the element temperature of the optical element 44 is 75° C. and the loss amount is 3 dB and when the gradient of the transmittance characteristics around the wavelength band B of the optical signal used as a transmission signal is substantially flat (See FIG. 8A), and if the transmittance characteristics are made to have gradient characteristics with the shorter wavelength side descending while maintaining the insertion loss in this wavelength band B to remain as it is (10 dB), the temperature of the optical element 44 is raised, for example, to about 85° C. and the attenuation amount of the VOA 47-1 is set to be 0 dB (See FIG. 8B). Here, in this case, the optical amplifier 47-2 is not allowed to have an amplification function.

The transmission characteristics evaluating section 148D determines the insertion loss gradient tolerance on the basis of the signal error measured by transmitting and receiving test signal light between the optical transmitting apparatus 2 and the optical receiving apparatus 3 while increasing or decreasing the insertion loss gradient as described above.

By the above-described construction, in the transmission characteristics evaluation system 100 according to the second embodiment of the present invention, the signal light obtained by modulation of light having a predetermined wavelength from the light source 23 with the PPG 21 is received by the optical receiving apparatus 3 via the pseudo transmission path apparatus 104; the BER tester 33 of the optical receiving apparatus 3 measures the signal error of the received optical signal; and the transmission characteristics evaluating section 148D of the controller 148 determines the insertion loss gradient tolerance as transmission characteristics on the basis of the signal error measured by the BER tester 33.

At this time, while the gradient of the transmittance band is adjusted by shifting the transmittance band center wavelength in an arbitrary dispersion value by regulation of the temperature of the optical element 44 through the element temperature regulator 44A by the setting in the element temperature setting section 148C, the change in the insertion loss is compensated for by the VOA 47-1 or the optical amplifier 47-2 by the setting in the insertion loss setting section 148B. This can continuously vary the gradient characteristics of the insertion loss around the wavelength band of the transmitted signal light.

The transmission characteristics evaluating section 148D measures the insertion loss gradient tolerance on the basis of the signal error measured by the BER tester 33 from the signal light that has been transmitted in such a setting state in which the gradient characteristics of the insertion loss changes continuously.

Here, by movably controlling the mirror 46 through the actuator 46A, the insertion loss gradient can be increased or decreased in a state in which the wavelength dispersion characteristics for each wavelength are set to be constant. This eliminates the need for considering the influence of dispersion with respect to the waveform gradient of the transmittance characteristics, thereby greatly enhancing the measurement precision as the insertion loss gradient tolerance.

Thus, with the transmission characteristics evaluation system according to the second embodiment of the present invention, by simply adding a function to the system for measurement of dispersion tolerance in the above-described first embodiment, not only the dispersion tolerance but also the insertion loss gradient tolerance can be measured in the common measurement system, so that the mode of use of the transmission characteristics evaluation system or the pseudo transmission path apparatus can be widened, and further the influence of dispersion can be fixed as a measurement condition in measuring the insertion loss gradient tolerance. This provides an advantage in that whether or not the error detection value detected by the BER tester 33 is due to the value of insertion loss can be correctly evaluated.

In the above-described embodiment, the optical transmitting apparatus 2 is provided with an electric/optical conversion section 22 for outputting an optical signal of a single wavelength (monowavelength), and the optical receiving apparatus 3 is provided with an optical/electric conversion section 32 for receiving the optical signal of the single wavelength from the optical transmitting apparatus 2, whereby the dispersion tolerance is measured by transmitting and receiving the optical signal of the single wavelength. However, the present invention is not limited to this, so that the transmission characteristics evaluation system for measuring the insertion loss gradient tolerance can be constructed while connecting an optical transmitting apparatus 2A for transmitting wavelength multiplexed light and an optical receiving apparatus 3A for receiving wavelength multiplexed light to the pseudo transmission path apparatus 4 in the same manner, for example, as in the modified example (See FIG. 4) of the first embodiment of the present invention.

[c] Description of the Third Embodiment of the Present Invention

Figure 9:
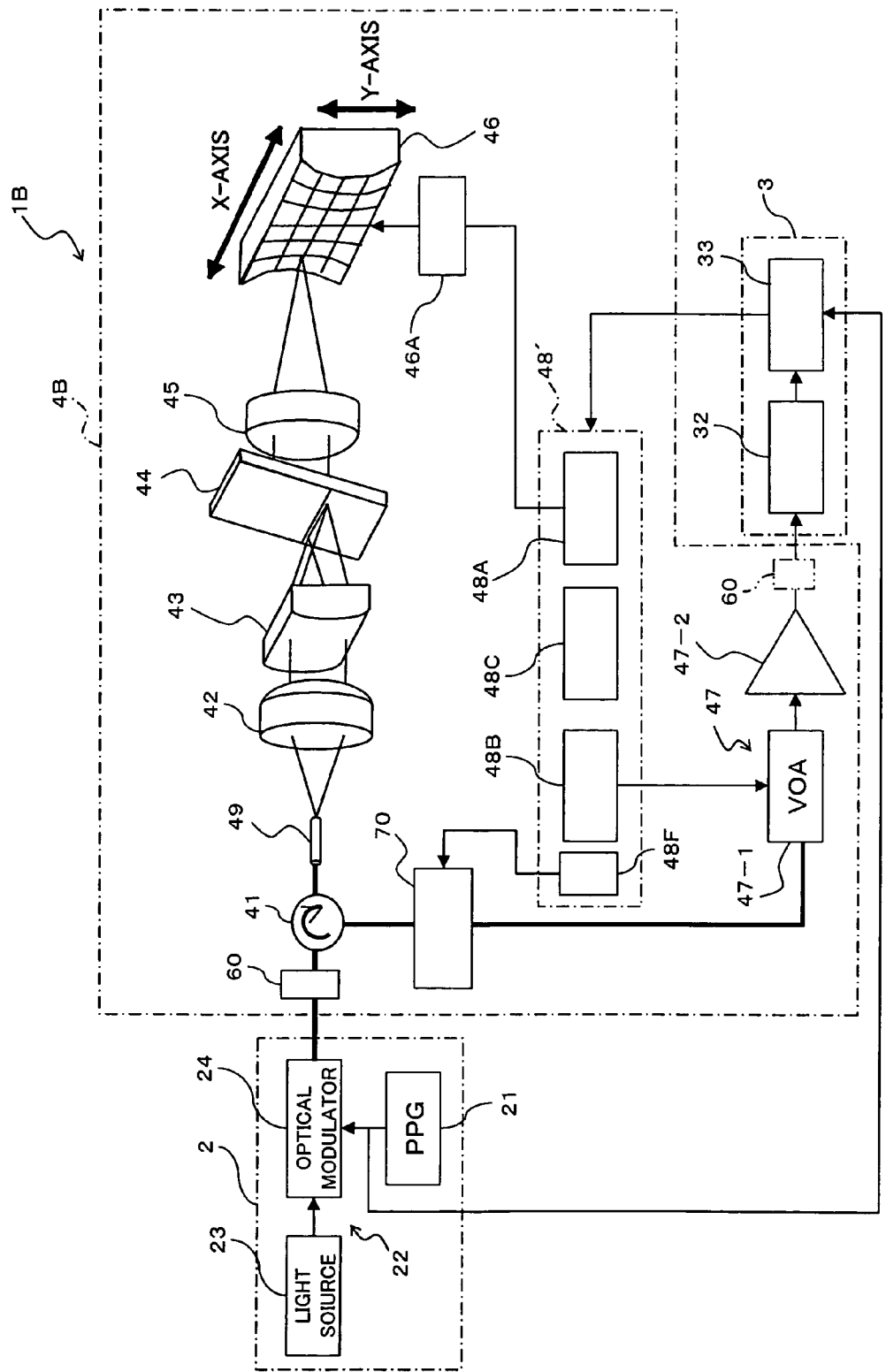
FIG. 9 is a block diagram illustrating a transmission characteristics evaluation system according to the third embodiment of the present invention.

FIG. 9 is a block diagram illustrating a transmission characteristics evaluation system 1B according to the third embodiment of the present invention. In this transmission characteristics evaluation system 1B illustrated in FIG. 9 also, the dispersion tolerance of the electric/optical conversion section 22 of the optical transmitting apparatus 2 or the optical/electric conversion section 32 of the optical receiving apparatus 3 is measured in the same manner as in the above-described first embodiment (See FIG. 1) of the present invention; however, the construction of the pseudo transmission path apparatus 4B is different from that of FIG. 1 described before.

Namely, the pseudo transmission path apparatus 4B of this transmission characteristics evaluation system 1B shown in FIG. 9 comprises a non-linear optical effect imparting section 60 and a polarization mode dispersion imparting section 70, and comprises a controller 48' obtained by adding a function to the one shown in FIG. 1 (See the reference numeral 48), unlike the above-described pseudo transmission path apparatus 4 shown in FIG. 1. Here, the construction other than the non-linear optical effect imparting section 60, the polarization mode dispersion imparting section 70, and the controller 48' described above is basically the same as in the above-described case of FIG. 1. Also, in FIG. 9, the same reference numerals as in FIG. 1 denote substantially the same parts.

Here, the non-linear optical effect imparting section 60 can give, in a pseudo manner, the influence produced by the non-linear optical effect that can be generated in an optical transmission path in an actual optical communication system, to the optical signal transmitted by the optical transmitting apparatus 2, and can be constructed, for example, with an SMF (Single Mode Fiber) as well as with a DSF (Dispersion Shift Fiber) connected immediately after the optical transmitting apparatus 2.

Here, when the pseudo transmission path apparatus 4B is constructed assuming that the length of the optical transmission path in an actual optical communication system is, for example, about 100 to 200 km, the sites that may cause generation of the non-linear optical effect are considered to be sites having a comparatively strong optical signal level and being at about 10 km on the transmitting side of the optical signal in the actual optical transmission path, so that it is sufficient for the length of the DSF or the SMF serving as the above-described non-linear optical effect imparting section 60 to be about 10 km, for example.

Here, the above-described non-linear optical effect imparting section 60 is disposed immediately after the above-described optical transmitting apparatus 2; however, the non-linear optical effect imparting section 60 may be disposed at a stage subsequent to the optical amplifier 47-2 of FIG. 9 as a site having a comparatively strong optical signal level.

Further, the polarization mode dispersion imparting section 70 can give polarization mode dispersion to the signal light returned by the mirror 46 and outputted from the optical element 44. More specifically, the polarization mode dispersion imparting section 70 receives input of the optical signal reflected by the mirror 46 via the focusing lens 45, the optical element 44, the line focus lens 43, the collimating lens 42, and the optical circulator 41, and can give to this input optical signal an influence produced by polarization mode dispersion that can be generated in an optical transmission path in an actual optical communication system.

The optical fibers constituting an actual optical transmission path often cannot be disposed to extend linearly at all the sites, so that there may be sites where the optical fibers are wound. At such sites where the optical fibers are wound, there may be time difference in the propagation speed between the inner circumference and the outer circumference. This polarization mode dispersion imparting section 70 can reproduce, in a pseudo manner, such a time difference in the propagation speed caused by the actual optical transmission path.

Figure 10:
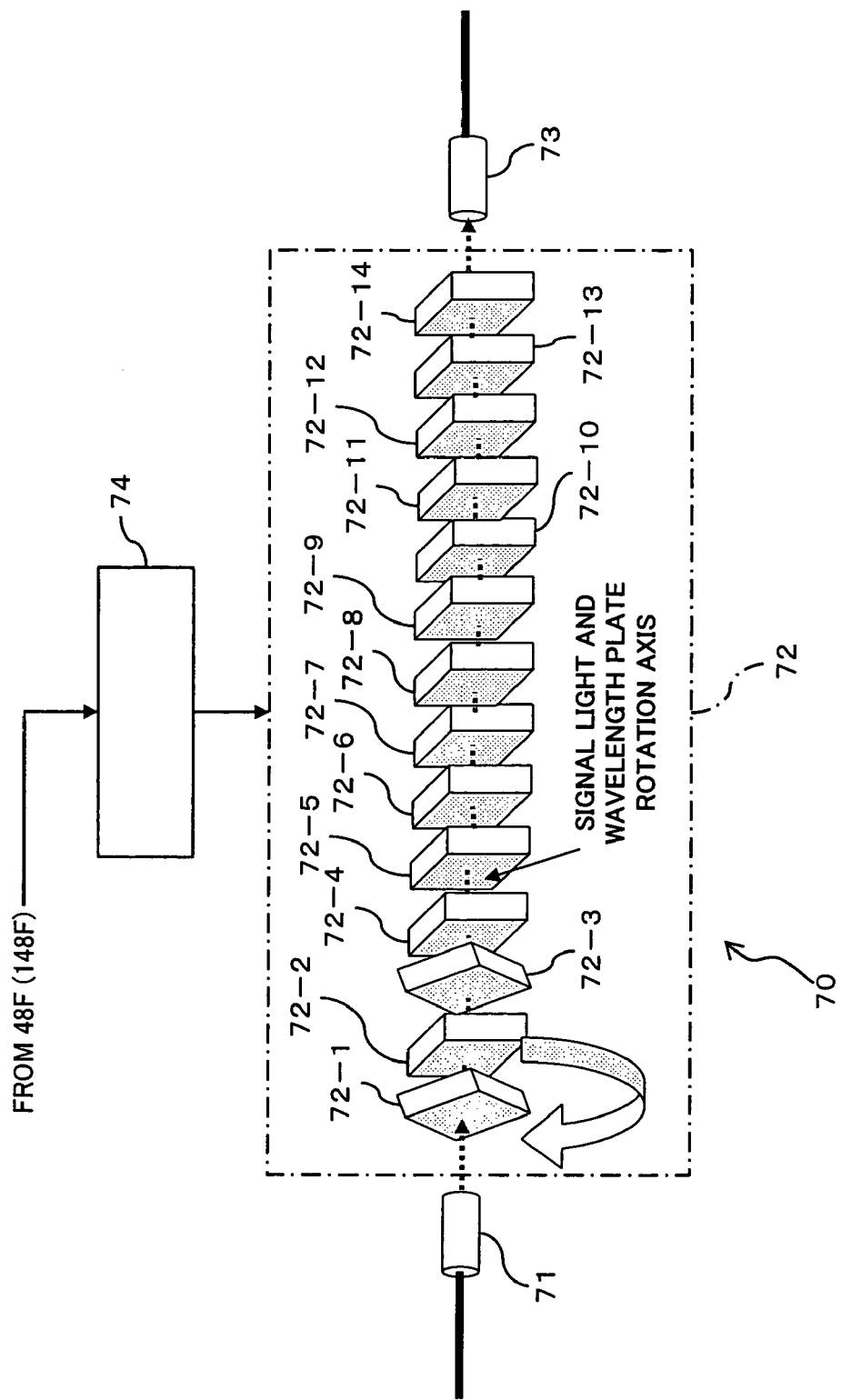
FIG. 10 is a block diagram illustrating a construction of an essential part of the transmission characteristics evaluation system according to the third embodiment of the present invention.

This polarization mode dispersion imparting section 70 can be made, for example, with plural wavelength plates such as shown in FIG. 10. Namely, the polarization mode dispersion imparting section 70 can be constructed to comprise, for example, an input light collimator 71, plural wavelength plates 72-1 to 72-$n$ multiply connected optically in series (in FIG. 10, n=14), an output collimator 73, and an actuator 74 for rotating the wavelength plates 72-1 to 72-$n$, as shown in this FIG. 10. Here, the technique of controlling the polarization mode using wavelength plates as in this polarization mode dispersion imparting section 70 shown in FIG. 10 is disclosed also in U.S. Pat. No. 6,493,474.

Here, the input collimator 71 receives input of an optical signal from the optical circulator 41 via the optical fiber 75 and outputs it as an optical signal of parallel light to the wavelength plate 72-1 at the subsequent stage. The wavelength plates 72-1 to 72-$n$ are a birefringent crystal having a structure in which the propagation speed of light differs in accordance with the crystal axis. Further, the actuator 74 can set the inclination of the crystal axis individually by rotating the wavelength plates 72-1 to 72-$n$ by a predetermined angle around the optical axis, and can be constructed, for example, with a stepping motor or the like.

Namely, the wavelength plates 72-1 to 72-$n$ are constructed to be capable of being rotated by the above-described actuator 74 around the optical axis along which the optical signals pass, whereby an arbitrary polarization mode dispersion can be imparted to the input optical signal by the rotation angle of the wavelength plates 72-1 to 72-$n$.

Figure 11:
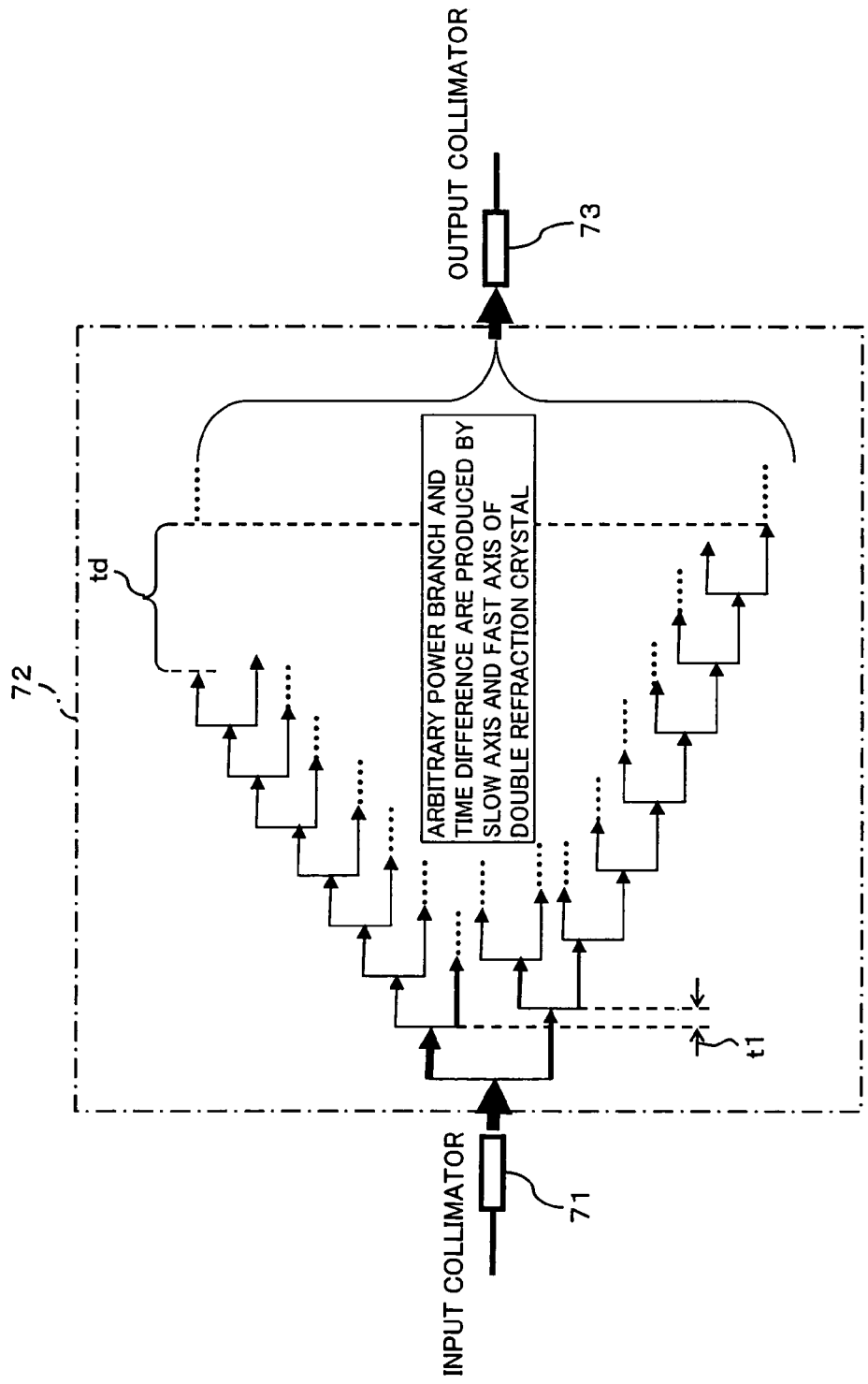
FIG. 11 is a view for describing the function of the essential part of the transmission characteristics evaluation system according to the third embodiment of the present invention.

For example, referring to FIG. 11, the optical signal that is input from the input collimator 71 into the wavelength plate 72-1 is separated into optical signal components having a time difference of t1 (i.e. polarization modes), and thereafter an arbitrary polarization mode dispersion is given by individually imparting the time difference of the separated polarization modes in the wavelength plates 72-2 to 72-8 by the propagation speed difference for each crystal axis direction of the wavelength plates themselves and the rotation angle. In the case of FIG. 11, the optical signal that propagates through the wavelength plates 72-1 to 72-8 can be given arbitrary power branches and time difference td with the polarization mode of the crystal axis having a comparatively slow propagation speed (slow axis) and the polarization mode of the crystal axis having a comparatively fast propagation speed (fast axis).

Here, an arbitrary polarization mode dispersion can be imparted in a wide range of values by suitably distributing the time differences of the propagation speed of light corresponding to the crystal axis in the wavelength plates 72-1 to 72-$n$ from those having a comparatively large time difference to those having a comparatively small time difference, in collaboration with the rotation of the wavelength plates 72-1 to 72-$n$ by the actuator 74. Namely, the polarization mode dispersion amount can be easily set widely and finely by providing different dimensions of the polarization mode dispersion amount imparted by the wavelength plates 72-1 to 72-$n$ (i.e. imparted propagation time difference).

Further, the output collimator 73 outputs the optical signal imparted with the polarization mode dispersion by the wavelength plates 72-1 to 72-$n$ to the optical fiber 76 as an output from the polarization mode dispersion imparting section 70. Then, the optical signal outputted from this polarization mode dispersion imparting section 70 is output to the VOA 47-1 via this optical fiber 76.

Also, the transmission characteristics setting section 48' comprises a polarization mode dispersion setting section 48F in addition to the reflection position setting section 48A, the loss amount setting section 48B, and the transmission characteristics evaluating section 48C similar to those provided in the above-described transmission characteristics setting section 48 in FIG. 1. This polarization mode dispersion setting section 48F sets the polarization mode dispersion amount that is imparted by the polarization mode dispersion imparting section 70.

In this case, the polarization mode dispersion setting section 48F can generate, in a pseudo manner, a polarization mode dispersion of the optical signal that can be generated in an optical transmission path in an actual optical communication system by setting the rotation amount of the wavelength plates 72-1 to 72-$n$ by the actuator 74.

In the transmission characteristics evaluation system 1B according to the third embodiment of the present invention constructed as described above also, the optical receiving apparatus 3 receives wavelength-multiplexed light (modulated by the PPG 21) from the optical transmitting apparatus 2 via the pseudo transmission path apparatus 4B, and the BER tester 33 of the optical receiving apparatus 3 measures the signal error of the received optical signal in the same manner as in the above-described case of FIG. 1. Further, the transmission characteristics evaluating section 48C accumulates the signal error measurement values from the BER tester 33 in correspondence with the dispersion values, so as to determine the dispersion tolerance as transmission characteristics.

At this time, the non-linear optical effect imparting section 60 gives, in a pseudo manner, the influence produced by the non-linear optical effect that can be generated in an optical transmission path in an actual optical communication system, to the optical signal transmitted by the optical transmitting apparatus 2. Then, the polarization mode dispersion imparting section 70 imparts the influence produced by the polarization mode dispersion that can be generated in an optical transmission path in an actual optical communication system, to the signal light returned by the mirror 46 and outputted from the optical element 44 by the setting of the polarization mode dispersion setting section 48F.

By this, the pseudo transmission path apparatus 4B can be allowed to have, in a pseudo manner, the characteristics of the non-linear optical effect and the polarization mode dispersion that an actual optical transmission path has, so that the transmission characteristics evaluating section 48C can perform measurement of the dispersion tolerance in an environment closer to the characteristics that an actual transmission path has.

Thus, in the same manner as in the above-described case of FIG. 1, the transmission characteristics evaluation system according to the third embodiment of the present invention provides an advantage in that the measurement of dispersion tolerance in evaluating the transmission characteristics of the electric/optical conversion section 22 or the optical/electric conversion section 32 serving as an optical module can be carried out at a high precision in a wide range continuously from a positive dispersion value to a negative dispersion value with reduced number of working steps as compared with the measurement by constructing a dummy fiber. In addition, the pseudo transmission path apparatus 4B can be allowed to have, in a pseudo manner, the characteristics of the non-linear optical effect and the polarization mode dispersion that an actual optical transmission path has, so that the transmission characteristics evaluating section 48C can perform measurement of the dispersion tolerance in an environment closer to the characteristics that an actual transmission path has, thereby outstandingly improving the precision in the measurement of dispersion tolerance.

[d] Description of the Fourth Embodiment of the Present Invention

Figure 12:
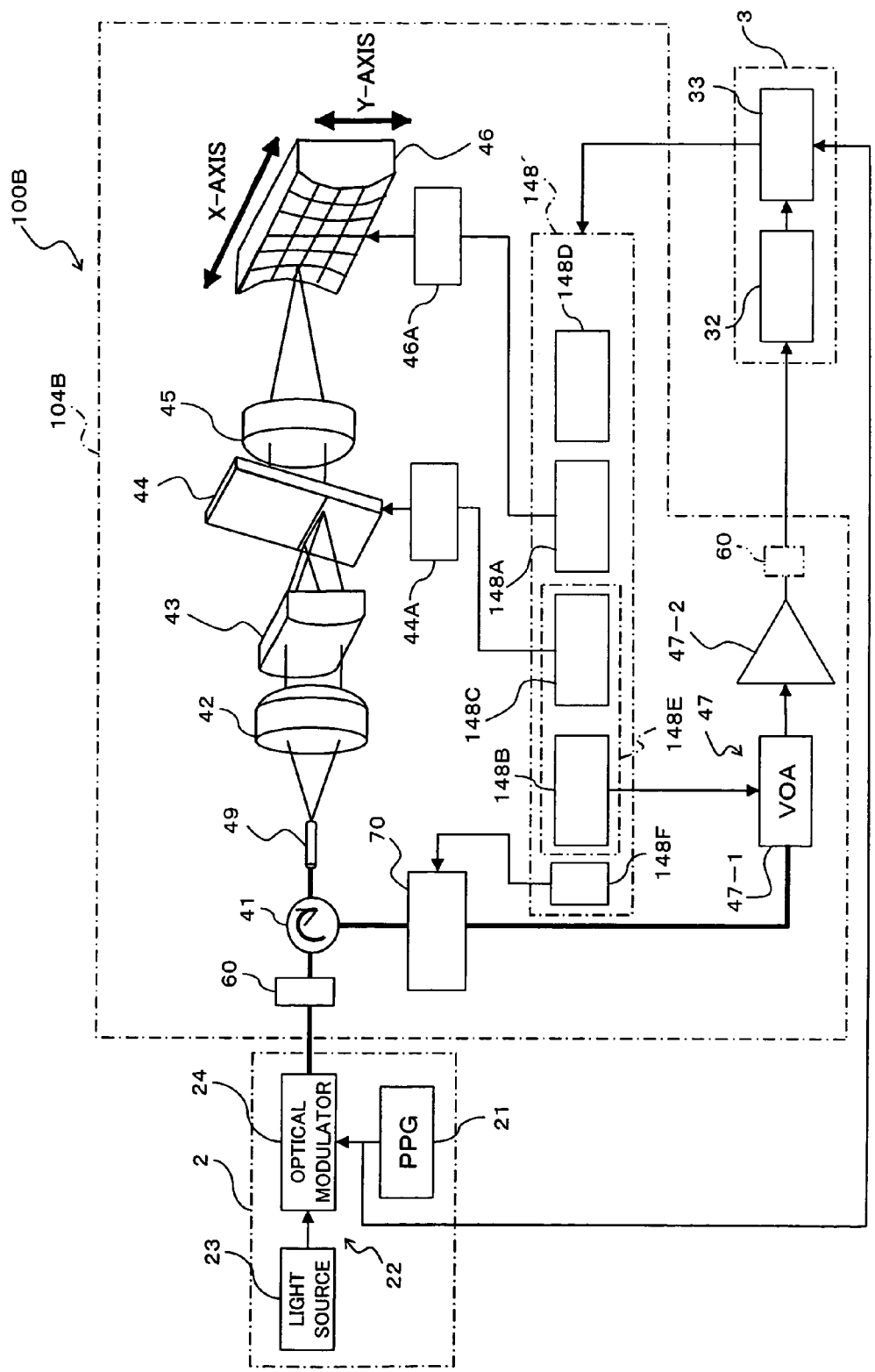
FIG. 12 is a block diagram illustrating a transmission characteristics evaluation system according to the fourth embodiment of the present invention.
Figure 13:
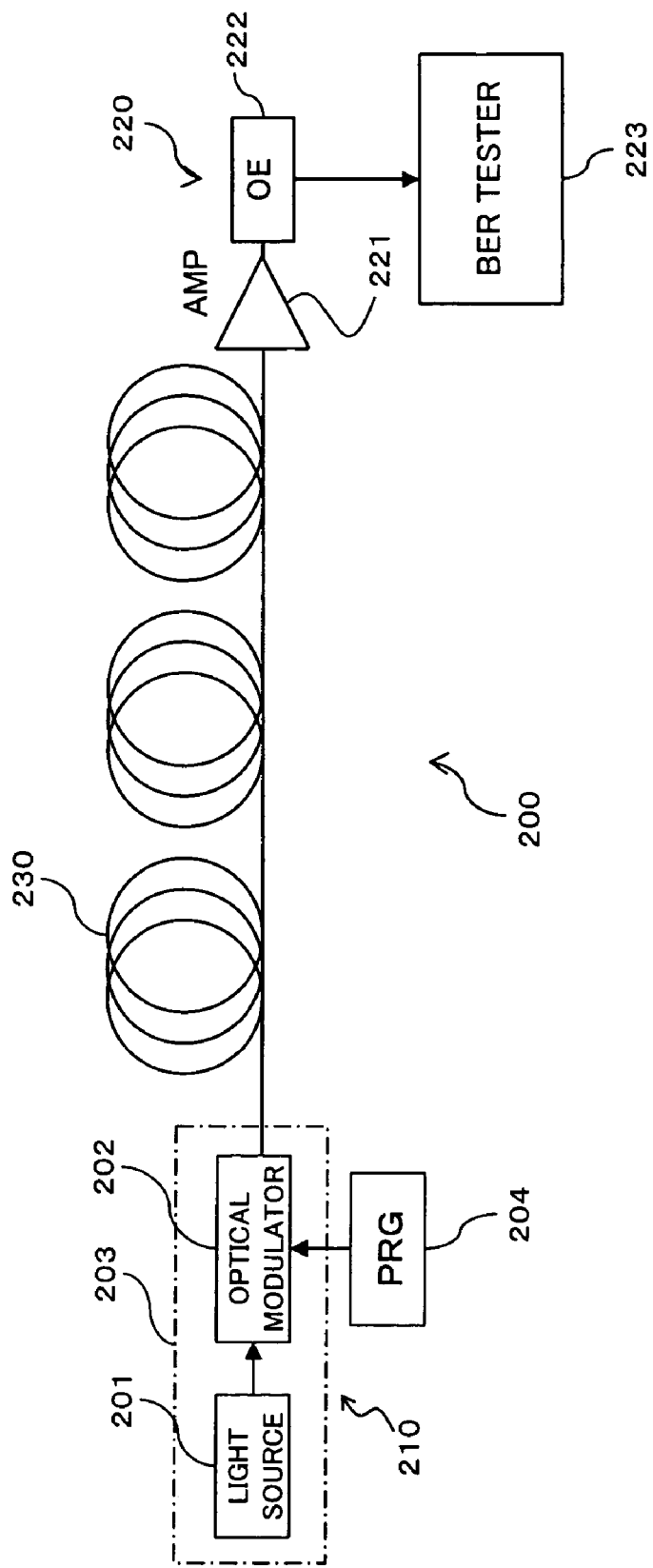
FIG. 13 is a block diagram illustrating a conventional system for measurement of dispersion tolerance.

FIG. 12 is a block diagram illustrating a transmission characteristics evaluation system 100B according to the fourth embodiment of the present invention. In this transmission characteristics evaluation system 100B illustrated in FIG. 12, the insertion loss gradient tolerance is measured in the same manner as in the above-described second embodiment (See FIG. 5) of the present invention; however, the construction of the pseudo transmission path apparatus 104B is different from that of FIG. 5 described before.

Namely, the transmission characteristics evaluation system 100B according to the fourth embodiment comprises a non-linear optical effect imparting section 60 and a polarization mode dispersion imparting section 70 similar to those of the above-described third embodiment, and comprises a controller 148' obtained by adding a function to the one shown in FIG. 5 (See the reference numeral 148). Here, the construction other than the non-linear optical effect imparting section 60, the polarization mode dispersion imparting section 70, and the controller 48' described above is basically the same as in the above-described case of FIG. 5. Also, in FIG. 9, the same reference numerals as in FIG. 1 denote substantially the same parts.

Here, the non-linear optical effect imparting section 60 can give, in a pseudo manner, the influence produced by the non-linear optical effect that can be generated in an optical transmission path in an actual optical communication system, to the optical signal transmitted by the optical transmitting apparatus 2 in the same manner as in the above-described case of FIG. 9, and can be constructed, for example, with an SMF (Single Mode Fiber) as well as with a DSF (Dispersion Shift Fiber) connected immediately after the optical transmitting apparatus 2. The non-linear optical effect imparting section 60 also may be disposed at a stage subsequent to the optical amplifier 47-2.

Further, the polarization mode dispersion imparting section 70 can give polarization mode dispersion to the signal light returned by the mirror 46 and outputted from the optical element 44 in the same manner as the above-described one shown in FIG. 9. The polarization mode dispersion imparting section 70 can have a construction similar to the above-described one shown in FIG. 11, or alternatively can be made to have a suitable different known construction capable of imparting a polarization mode.

Also, the controller 148' has a function as a transmission characteristics setting section for setting transmission characteristics equivalent to the transmission characteristics that a transmission path to which the optical transmitting apparatus 2 and the optical receiving apparatus 3 are to be connected can have, in the same manner as the above-described controller 148 shown in FIG. 5. Further, the controller 148' comprises a polarization mode dispersion setting section 148F in addition to a wavelength dispersion characteristics setting section 148A, an insertion loss gradient characteristics setting section 148E, and a transmission characteristics evaluating section 148D similar to those of the controller 148 shown in FIG. 5.

This polarization mode dispersion setting section 148F sets the polarization mode dispersion amount that is imparted to the optical signal propagating through the pseudo transmission path apparatus 104B, in the same manner as the above-described polarization mode dispersion setting section 48F shown in FIG. 9. Namely, the polarization mode dispersion setting section 148F can generate, in a pseudo manner, a polarization mode dispersion of the optical signal that can be generated in an optical transmission path in an actual optical communication system by setting the rotation amount of the wavelength plates 72-1 to 72-n by the actuator 74 of the above-described polarization mode dispersion imparting section 70 constructed as shown in FIG. 10.

In the transmission characteristics evaluation system 100B according to the fourth embodiment of the present invention constructed as described above also, the signal light obtained by modulation of light having a predetermined wavelength from the light source 23 with the PPG 21 is received by the optical receiving apparatus 3 via the pseudo transmission path apparatus 104B; the BER tester 33 of the optical receiving apparatus 3 measures the signal error of the received optical signal; and the transmission characteristics evaluating section 148D of the controller 148' determines the insertion loss gradient tolerance as transmission characteristics on the basis of the signal error measured by the BER tester 33, in the same manner as in the above-described case of FIG. 5.

At this time, the non-linear optical effect imparting section 60 gives, in a pseudo manner, the influence produced by the non-linear optical effect that can be generated in an optical transmission path in an actual optical communication system, to the optical signal transmitted by the optical transmitting apparatus 2. Then, the polarization mode dispersion imparting section 70 imparts the influence produced by the polarization mode dispersion that can be generated in an optical transmission path in an actual optical communication system, to the signal light returned by the mirror 46 and outputted from the optical element 44 by the setting of the polarization mode dispersion setting section 48F.

By this, the pseudo transmission path apparatus 104B can be allowed to have, in a pseudo manner, the characteristics of the non-linear optical effect and the polarization mode dispersion that an actual optical transmission path has, so that the transmission characteristics evaluating section 148D can perform measurement of the insertion loss gradient tolerance in an environment closer to the characteristics that an actual transmission path has.

Thus, in the transmission characteristics evaluation system 100B of the fourth embodiment of the present invention, the insertion loss gradient tolerance can be measured in the same manner as in the above-described case of FIG. 5, so that the mode of use of the transmission characteristics evaluation system or the pseudo transmission path apparatus can be widened, and further this provides an advantage in that whether or not the error detection value detected by the BER tester 33 is due to the value of insertion loss can correctly evaluate. In addition, the pseudo transmission path apparatus 4B can be allowed to have, in a pseudo manner, the characteristics of non-linear optical effect and polarization mode dispersion that a real optical transmission path has. This provides an advantage in that the transmission characteristics evaluating section 148D can measure the insertion loss gradient tolerance in an environment that is closer to the characteristics that the real transmission path has, thereby outstandingly improving the precision in the measurement of insertion loss gradient tolerance.

[e] Others

Here, irrespective of the above-described embodiments, various modifications can be made for implementation within a range that does not depart from the gist of the present invention.

For example, in the above-described third and fourth embodiments, the polarization mode dispersion imparting section 70 is constructed with wavelength plates; however, the present invention is not limited to this alone, so that the polarization mode dispersion imparting section 70 can be made to have a suitable different known construction capable of imparting a polarization mode. For example, it may be considered that optical waveguides of Mach Zenda type are suitably connected in tandem, and an arbitrary polarization mode is imparted by applying an electric field to each optical waveguide. In this case, the polarization mode dispersion setting section of the controllers 48', 148' can set the polarization mode dispersion by having a construction to set the magnitude of the electric field to be applied to each optical waveguide.

Also, by simply comprising at least one of the non-linear optical effect imparting section 60 and the polarization mode dispersion imparting section 70 that are provided in the above-described third and fourth embodiments, at least the pseudo transmission path apparatus can be approximated to the characteristics of an actual optical transmission path, so that the precision of measuring the dispersion tolerance and the insertion loss gradient tolerance can be improved as compared with the above-described case of FIG. 1 or FIG. 5. Also, when only the non-linear optical effect imparting section 60 is provided and the mounting of the polarization mode dispersion imparting section 70 is omitted, the need for providing the polarization mode setting sections 48F, 148F in the controller is eliminated.

Also, when the embodiments of the present invention are disclosed, those skilled in the art can carry out the production thereof.

As described above, the transmission characteristics evaluation system and the pseudo transmission path apparatus of the present invention are useful, for example, in performing characteristics evaluation of an optical communication transmission system, and in particular is suitable in enabling measurement of dispersion tolerance and insertion loss gradient tolerance at a high precision with reduced number of working steps for the measurement in evaluating the transmission characteristics of an optical module.

What is claimed is:

1. A transmission characteristics evaluation system comprising an optical transmitting apparatus for transmitting an optical signal, an optical receiving apparatus for receiving the optical signal from the optical transmitting apparatus, and a pseudo transmission path apparatus interposed between the optical transmitting apparatus and the optical receiving apparatus, said pseudo transmission path apparatus having simulated transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the optical transmitting apparatus comprises a pulse signal generator for generating an electric pulse signal of a specific pattern and an electric/optical converting section capable of converting the electric pulse signal generated by the pulse signal generator into an optical signal, said optical transmitting apparatus being constructed to transmit the optical signal from the electric/optical converting section as said optical test signal, the pseudo transmission path apparatus comprises an optical element for emitting the signal light transmitted by the optical transmitting apparatus at an output angle that is different depending on a wavelength by subjecting the signal light to multiple reflection for self interference, a lens for converging the signal light emitted from the optical element, a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens, and a transmission characteristics setting section for setting transmission characteristics equivalent to transmission characteristics that the transmission path to which the optical transmitting apparatus and the optical receiving apparatus are to be connected can have, by controlling the mirror or the optical element, and the optical receiving apparatus comprises an optical/electric converting section being capable of converting the optical signal from the optical transmitting apparatus into an electric signal by receiving an input of the optical signal via the pseudo transmission path apparatus in which the transmission characteristics have been set, and a signal error measuring device for measuring a signal error by comparing the electric signal from the optical/electric converting section with the electric pulse signal generated by the optical pulse signal generator, whereby the transmission characteristics of the electric/optical converting section or the optical/electric converting section are evaluated in accordance with the signal error measured by the signal error measuring device of the optical receiving apparatus.

2. The transmission characteristics evaluation system of claim 1, wherein the electric/optical converting section of the optical transmitting apparatus is constructed to be capable of converting the electric pulse signal into plural optical signals that are different from each other, and outputting the converted plural optical signals as wavelength multiplex light, the optical/electric converting section of the optical receiving apparatus is constructed to be capable of converting the optical signals constituting the wavelength multiplex light from the optical transmitting apparatus respectively into electric signals after performing wavelength separation by receiving an input of the optical signals via the pseudo transmission path apparatus in which the transmission characteristics have been set, and the signal error measuring device of the optical receiving apparatus is constructed to measure the signal error on the electric signals that have been converted after being subjected to the wavelength separation.

3. The transmission characteristics evaluation system of claim 1, wherein the transmission characteristics setting section of the pseudo transmission path apparatus is constructed with a wavelength dispersion characteristics setting section for setting wavelength dispersion characteristics equivalent to wavelength dispersion characteristics that the transmission path to which the optical transmitting apparatus and the optical receiving apparatus are to be connected can have, by setting an amount of movability of the mirror.

4. The transmission characteristics evaluation system of claim 1, wherein the pseudo transmission path apparatus is provided with a loss imparting section for imparting a predetermined amount of loss on the signal light that is output from the optical element to the optical receiving apparatus, wherein the transmission characteristics setting section of the pseudo transmission path apparatus is constructed to comprise a wavelength dispersion characteristics setting section for setting wavelength dispersion characteristics equivalent to wavelength dispersion characteristics that the transmission path to which the optical transmitting apparatus and the optical receiving apparatus are to be connected can have, by controlling the mirror in a movable manner, and a loss amount setting section for setting an amount of loss imparted by the loss imparting section so as to attain loss characteristics equivalent to an amount of loss that the transmission path to which the optical transmitting apparatus and the optical receiving apparatus are to be connected can have.

5. The transmission characteristics evaluation system of claim 1, wherein the pseudo transmission path apparatus is provided with a loss imparting section for imparting a predetermined amount of loss on the signal light that is output from the optical element to the optical receiving apparatus and an element temperature regulator for regulating an element temperature of the optical element, wherein the transmission characteristics setting section of the pseudo transmission path apparatus comprises a wavelength dispersion characteristics setting section for setting wavelength dispersion characteristics for each wavelength to be constant by controlling the mirror in a movable manner, and is constructed to comprise an insertion loss gradient characteristics setting section for setting an amount of loss of the signal light imparted by the loss imparting section and a regulated temperature of the optical element regulated by the element temperature regulator so as to obtain insertion loss gradient characteristics equivalent to insertion loss gradient characteristics that the transmission path can have while maintaining the wavelength dispersion characteristics for each wavelength to be constant by the wavelength dispersion characteristics setting section.

6. The transmission characteristics evaluation system of claim 1, wherein the pseudo transmission path apparatus comprises a polarization mode dispersion imparting section being capable of giving a polarization mode dispersion to the signal light that is returned by the mirror and outputted from the optical element, and the transmission characteristics setting section sets the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

7. The transmission characteristics evaluation system of claim 1, wherein the pseudo transmission path apparatus is constructed to comprise a non-linear optical effect imparting section being capable of giving a non-linear optical effect to the signal light that is transmitted by the optical transmitting apparatus.

8. A pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises:
  an optical element for emitting the test signal light transmitted by the optical transmitting apparatus at an output angle that is different depending on a wavelength by subjecting the test signal light to multiple reflection for self interference;
  a lens for converging the signal light emitted from the optical element;
  a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens; and
  a transmission characteristics setting section for setting transmission characteristics equivalent to transmission characteristics that the transmission path to which the optical transmitting apparatus and the optical receiving apparatus are to be connected can have, by controlling the mirror or the optical element.

9. The pseudo transmission path apparatus in the transmission characteristics evaluation system of claim 8, comprising a polarization mode dispersion imparting section being capable of giving a polarization mode dispersion to the signal light that is returned by the mirror and outputted from the optical element, wherein the transmission characteristics setting section sets the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

10. The pseudo transmission path apparatus in the transmission characteristics evaluation system of claim 8, which is constructed to comprise a non-linear optical effect imparting section being capable of giving a non-linear optical effect to the signal light that is transmitted by the optical transmitting apparatus.

11. A transmission characteristics evaluation system comprising an optical transmitting apparatus for outputting an optical signal, an optical receiving apparatus for receiving an input of the optical signal from the optical transmitting apparatus, and a pseudo transmission path apparatus interposed between the optical transmitting apparatus and the optical receiving apparatus, said optical transmitting apparatus comprising a pulse signal generator for generating an electric pulse signal and an electric/optical converting section capable of converting the electric pulse signal into the optical signal to be output, said optical receiving apparatus comprising an optical/electric converting section capable of converting the input optical signal into an electric signal and a signal error measuring device for measuring a signal error by comparing the electric signal with the electric pulse signal, wherein
  said pseudo transmission path apparatus comprises a variable wavelength dispersion element capable of imparting a different wavelength dispersion to light of a different wavelength and a polarization mode dispersion imparting section capable of giving a polarization mode dispersion to output light of the variable wavelength dispersion element,
  said variable wavelength dispersion element comprises an optical element that forms an array of virtual images by allowing a converged input light to propagate between first and second reflection surfaces, wherein light that has been transmitted through one of the reflection surfaces interferes and different wavelengths with a constant wavelength interval are output at a same output angle, a lens for converging the light emitted from the optical element, and a mirror for returning the output light to the optical element via the lens and giving a different wavelength dispersion depending on a reflection position of the light converged by the lens, and
  said pseudo transmission path apparatus sets transmission characteristics equivalent to transmission characteristics that a transmission path to which the optical transmitting apparatus and the optical receiving apparatus are to be connected can have, by controlling the polarization mode dispersion imparting section together with the mirror or the optical element of the variable wavelength dispersion element.

12. The transmission characteristics evaluation system of claim 11, wherein the pseudo transmission path apparatus comprises a non-linear optical effect imparting section being capable of giving a non-linear optical effect to the signal light that is output from the optical transmitting apparatus.

13. The transmission characteristics evaluation system of claim 11, wherein the transmission characteristics setting section comprises a polarization mode dispersion controlling section that controls the polarization mode dispersion given by the polarization mode dispersion imparting section to be equivalent to polarization mode dispersion characteristics that a transmission path to which the optical transmitting apparatus and the optical receiving apparatus are to be connected can have.

14. A transmission characteristics evaluation system comprising an optical transmitting apparatus for outputting an optical signal, an optical receiving apparatus for receiving an input of the optical signal from the optical transmitting apparatus, and a pseudo transmission path apparatus interposed between the optical transmitting apparatus and the optical receiving apparatus, said optical transmitting apparatus comprising a pulse signal generator for generating an electric pulse signal and an electric/optical converting section capable of converting the electric pulse signal into the optical signal to be output, said optical receiving apparatus comprising an optical/electric converting section capable of converting the input optical signal into an electric signal and a signal error measuring device for measuring a signal error by comparing the electric signal with the electric pulse signal, wherein said pseudo transmission path apparatus comprises a variable wavelength dispersion element capable of imparting a different wavelength dispersion to light of a different wavelength and a polarization mode dispersion imparting section capable of giving a polarization mode dispersion to output light of the variable wavelength dispersion element, said variable wavelength dispersion element comprises an optical element that forms an array of virtual images by allowing a converged input light to propagate between first and second reflection surfaces, wherein light that has been transmitted through one of the reflection surfaces interferes and different wavelengths with a constant wavelength interval are output at a same output angle, a lens for converging the light emitted from the optical element, and a mirror for returning the output light to the optical element via the lens and giving a different wavelength dispersion depending on a reflection position of the light converged by the lens, and said pseudo transmission path apparatus comprises a non-linear optical effect imparting section being capable of giving a non-linear optical effect to the signal light that is output from the optical transmitting apparatus.

15. The transmission characteristics evaluation system of claim 11, wherein the electric/optical converting section of the optical transmitting apparatus is constructed to be capable of converting the electric pulse signal into plural optical signals that are different from each other, and outputting the converted plural optical signals as wavelength multiplex light, the optical/electric converting section of the optical receiving apparatus is constructed to be capable of converting the optical signals constituting the wavelength multiplex light from the optical transmitting apparatus respectively into electric signals after performing wavelength separation by receiving an input of the optical signals via the pseudo transmission path apparatus in which the transmission characteristics have been set, and the signal error measuring device of the optical receiving apparatus is constructed to measure the signal error on the electric signals that have been converted after being subjected to the wavelength separation.

16. The transmission characteristics evaluation system of claim 11, wherein the transmission characteristics setting section of the pseudo transmission path apparatus is constructed to comprise a wavelength dispersion characteristics setting section for setting wavelength dispersion characteristics equivalent to wavelength dispersion characteristics that the transmission path to which the optical transmitting apparatus and the optical receiving apparatus are to be connected can have, by setting an amount of movability of the mirror.

17. The transmission characteristics evaluation system of claim 11, wherein the pseudo transmission path apparatus is provided with a loss imparting section for imparting a predetermined amount of loss on the signal light that is output from the optical element to the optical receiving apparatus, wherein the transmission characteristics setting section of the pseudo transmission path apparatus is constructed to comprise a wavelength dispersion characteristics setting section for setting wavelength dispersion characteristics equivalent to dispersion characteristics that the transmission path to which the optical transmitting apparatus and the optical receiving apparatus are to be connected can have, by controlling the mirror in a movable manner, and a loss amount setting section for setting an amount of loss imparted by the loss imparting section so as to attain loss characteristics equivalent to an amount of loss that the transmission path to which the optical transmitting apparatus and the optical receiving apparatus are to be connected can have.

18. The transmission characteristics evaluation system of claim 11, wherein the pseudo transmission path apparatus is provided with a loss imparting section for imparting a predetermined amount of loss on the signal light that is output from the optical element to the optical receiving apparatus and an element temperature regulator for regulating an element temperature of the optical element, wherein the transmission characteristics setting section of the pseudo transmission path apparatus comprises a wavelength dispersion characteristics setting section for setting wavelength dispersion characteristics for each wavelength to be constant by controlling the mirror in a movable manner, and is constructed to comprise an insertion loss gradient characteristics setting section for setting an amount of loss of the signal light imparted by the loss imparting section and a regulated temperature of the optical element regulated by the element temperature regulator so as to obtain insertion loss gradient characteristics equivalent to insertion loss gradient characteristics that the transmission path can have while maintaining the wavelength dispersion characteristics for each wavelength to be constant by the dispersion characteristics setting section.

19. A pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises:
- an optical element for emitting the test signal light transmitted by the optical transmitting apparatus at an output angle that is different depending on a wavelength by subjecting the test signal light to multiple reflection for self interference;
- a lens for converging the signal light emitted from the optical element;
- a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens;
- a transmission characteristics setting section for setting transmission characteristics equivalent to transmission characteristics that the transmission path to which the optical transmitting apparatus and the optical receiving apparatus are to be connected can have, by controlling the mirror or the optical element; and
- a polarization mode dispersion imparting section being capable of giving a polarization mode dispersion to the signal light that is returned by the mirror and outputted from the optical element,
- wherein the transmission characteristics setting section sets the transmission characteristics equivalent to the transmission characteristics that the transmission path to which the optical transmitting apparatus and the optical receiving apparatus are to be connected can have, by controlling the polarization mode dispersion imparting section together with the mirror or the optical element.

20. A pseudo transmission path apparatus in a transmission characteristics evaluation system comprising an optical transmitting apparatus for transmitting an optical signal and an optical receiving apparatus for receiving the optical signal from the optical transmitting apparatus, said pseudo transmission path apparatus being interposed between the optical transmitting apparatus and the optical receiving apparatus, said pseudo transmission path apparatus having, in a pseudo manner, transmission characteristics of a transmission path to which the optical transmitting apparatus and the optical receiving apparatus are to be connected, said transmission characteristics evaluation system evaluating transmission characteristics of the optical transmitting apparatus or the optical receiving apparatus by transmitting and receiving an optical test signal between the optical transmitting apparatus and the optical receiving apparatus, wherein the pseudo transmission path apparatus comprises:
- an optical element for emitting the test signal light transmitted by the optical transmitting apparatus at an output angle that is different depending on a wavelength by subjecting the test signal light to multiple reflection for self interference;
- a lens for converging the signal light emitted from the optical element;
- a mirror for reflecting the signal light converged by the lens to return the signal light to the lens so that the returned signal light may receive multiple reflection in the optical element to be output as a signal light to the optical receiving apparatus, said mirror being capable of giving a different wavelength dispersion to the signal light to the optical receiving apparatus depending on a reflection surface position of the signal light converged by the lens;
- a transmission characteristics setting section for setting transmission characteristics equivalent to transmission characteristics that the transmission path to which the optical transmitting apparatus and the optical receiving apparatus are to be connected can have, by controlling the mirror or the optical element; and
- a non-linear optical effect imparting section being capable of giving a non-linear optical effect to the signal light that is transmitted by the optical transmitting apparatus.

* * * * *

UNITED STATES PATENT AND TRADEMARK OFFICE
CERTIFICATE OF CORRECTION

PATENT NO.       : 7,343,094 B2
APPLICATION NO.  : 11/100599
DATED            : March 11, 2008
INVENTOR(S)      : Yuichi Kawahata It is certified that error appears in the above-identified patent and that said Letters Patent is hereby corrected as shown below:

Title page, Col. 2,
(74) (Attorney, Agent or Firm)
Delete "Stass" and insert therefor --Staas--

Signed and Sealed this

Twenty-ninth Day of July, 2008

JON W. DUDAS
*Director of the United States Patent and Trademark Office*